United States Patent
Liang et al.

(10) Patent No.: US 11,749,808 B2
(45) Date of Patent: Sep. 5, 2023

(54) ELECTRODE PLATE AND ELECTROCHEMICAL DEVICE

(71) Applicant: Contemporary Amperex Technology Co., Limited, Ningde (CN)

(72) Inventors: Chengdu Liang, Ningde (CN); Jing Li, Ningde (CN); Wei Li, Ningde (CN); Qingrui Xue, Ningde (CN); Zige Zhang, Ningde (CN); Yang Zhang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 243 days.

(21) Appl. No.: 17/335,034

(22) Filed: May 31, 2021

(65) Prior Publication Data

US 2021/0296654 A1   Sep. 23, 2021

Related U.S. Application Data

(63) Continuation of application No. PCT/CN2019/119717, filed on Nov. 20, 2019.

(30) Foreign Application Priority Data

Dec. 29, 2018   (CN) .......................... 201811638405.2

(51) Int. Cl.
| | |
|---|---|
| H01M 4/66 | (2006.01) |
| H01M 4/62 | (2006.01) |
| H01M 4/505 | (2010.01) |
| H01M 4/525 | (2010.01) |
| H01M 10/0525 | (2010.01) |
| H01M 4/02 | (2006.01) |

(52) U.S. Cl.
CPC ........... *H01M 4/667* (2013.01); *H01M 4/625* (2013.01); *H01M 4/662* (2013.01); *H01M 4/505* (2013.01); *H01M 4/525* (2013.01); *H01M 4/623* (2013.01); *H01M 10/0525* (2013.01); *H01M 2004/027* (2013.01); *H01M 2004/028* (2013.01); *H01M 2220/10* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 4,492,021 A | 1/1985 | Wright et al. | |
| 2002/0160265 A1 | 10/2002 | Hashimoto et al. | |
| 2006/0019168 A1 | 1/2006 | Li et al. | |
| 2009/0305135 A1 | 12/2009 | Shi et al. | |
| 2014/0162138 A1* | 6/2014 | Fujiki | H01M 10/0562 |
| | | | 429/304 |
| 2016/0211524 A1 | 7/2016 | Hao et al. | |
| 2019/0173092 A1* | 6/2019 | Liang | H01M 4/662 |

FOREIGN PATENT DOCUMENTS

| | | |
|---|---|---|
| CN | 102306800 A | 1/2012 |
| CN | 102332558 A | 1/2012 |
| CN | 102569816 A | 7/2012 |
| CN | 203218375 U | 9/2013 |
| CN | 103545530 A | 1/2014 |
| CN | 106463698 A | 2/2017 |
| CN | 106935901 A | 7/2017 |
| CN | 107221676 A | 9/2017 |
| CN | 107565137 A | 1/2018 |
| CN | 107768677 A | 3/2018 |
| CN | 108155363 A | 6/2018 |
| CN | 108281662 A | 7/2018 |
| EP | 3367485 A1 | 8/2018 |

OTHER PUBLICATIONS

Machine translation of CN106935901, published on Jul. 7, 2017 (Year: 2017).*
The extended European search report for EP Application No. 19902246.8, dated Nov. 29, 2021, 9 pages.
The Second Office Action for China Application No. 201811638405. 2, dated Aug. 28, 2020, 7 pages.
PCT International Search Report for PCT/CN2019/119717, dated Jan. 23, 2020, 14 pages.
First Office Action for China Application No. 201811638405.2, dated Jun. 9, 2020, 10 pages.
The First Examination Report for EP Application No. 19902246.8, dated Jul. 1, 2022, 6 pages.

* cited by examiner

*Primary Examiner* — Anca Eoff
(74) *Attorney, Agent, or Firm* — East IP P.C.

(57) ABSTRACT

The electrode plate according to the present application includes a current collector and an electrode active material layer disposed on at least one surface of the current collector, wherein the current collector includes a support layer and a conductive layer disposed on at least one surface of the support layer, the conductive layer has a single-sided thickness D2 satisfying: 30 nm ≤ D2 ≤ 3 μm; and a conductive primer layer containing a first conductive material and a binder is provided between the current collector and the electrode active material layer, and the first conductive material in the conductive primer layer comprises at least one of a one-dimensional conductive material and a two-dimensional conductive material. The electrode plate of the present application has good workability, and the electrochemical device including the electrode plate has high energy density, good electrical performance and long-term reliability.

18 Claims, 8 Drawing Sheets

ELECTRODE PLATE AND ELECTROCHEMICAL DEVICE

CROSS-REFERENCE TO RELATED APPLICATION

This application is a continuation of International Application No. PCT/CN2019/119717, filed on Nov. 20, 2019, which claims priority to Chinese Patent Application No. 201811638405.2, filed on Dec. 29, 2018, both of which are incorporated herein by reference in their entireties.

TECHNICAL FIELD

The present application relates to the field of battery, and more particularly, to an electrode plate and an electrochemical device.

BACKGROUND

Lithium-ion batteries are widely used in electric vehicles and consumer electronics because of their high energy density, high output power, long cycle life and small environmental pollution. With the continuous expansion of the application range of lithium ion batteries, the requirements for mass energy density and volume energy density of lithium ion batteries are getting higher and higher.

In order to obtain lithium-ion batteries with higher mass energy density and volume energy density, lithium-ion batteries usually are improved by: (1) selecting a positive electrode material or negative electrode material with a high specific discharge capacity; (2) optimizing the mechanical design of lithium-ion batteries to minimize their volume; (3) selecting a positive electrode plate or negative electrode plate with high compaction density; and (4) decreasing the weight of each component of lithium ion batteries.

Among them, the improvement to current collectors is usually made by selecting current collectors with a reduced weight or thickness. For example, a perforated current collector or a metal-plated plastic current collector can be used.

For the electrode plate and batteries utilizing a metal-plated plastic current collector, it is possible to bring about some performance degradations in terms of processing performance, safety performance, and electrical performance, although their energy density may be increased. It is necessary to make further improvements in order to obtain electrode plates and current collectors with good electrochemical performance.

In order to overcome the shortcomings of the prior art, the present application is submitted.

SUMMARY

In view of this, the present application provides an electrode plate and an electrochemical device.

In a first aspect, the present application relates to an electrode plate, including a current collector and an electrode active material layer disposed on at least one surface of the current collector, wherein the current collector includes a support layer and a conductive layer disposed on at least one surface of the support layer, the conductive layer has a single-sided thickness D2 that satisfies: $30 \text{ nm} \leqslant D2 \leqslant 3$ μm; a conductive primer layer containing a first conductive material and a binder is provided between the current collector and the electrode active material layer, and the first conductive material in the conductive primer layer includes at least one of a one-dimensional conductive material and a two-dimensional conductive material.

In a second aspect, the present application relates to an electrochemical device including a positive electrode plate, a negative electrode plate, a separator and electrolyte, wherein the positive electrode plate and/or negative electrode plate are the electrode plate as described in the first aspect.

Technical solutions of the present application have at least the following beneficial effects:

The conductive primer layer can improve the interface of the composite current collector and can improve the binding force between the current collector and the electrode active material layer, and ensure that the electrode active material layer is more firmly disposed on the surface of the composite current collector. Such a structure may favorably overcome the disadvantages that the composite current collector has poor conductivity and that the conductive layer in the composite current collector is easy to be damaged. Furthermore, the above structure may improve electron transmission efficiency and reduce the electrical resistance between the current collector and the electrode active material layer by effectively repairing and constructing the conductive network between the current collector, the conductive primer layer and the active material in the electrode active material layer. Therefore, the electrode plate as mentioned above may effectively reduce the direct current internal resistance of battery cell, can increase the power performance of battery cell and may ensure that the battery cell is not prone to significant polarization and lithium precipitation during long-term cycling. That is to say, the long-term reliability of battery cell is effectively improved. Thus, the electrode plate and electrochemical device of the present application have good and balanced electrical performance, safety performance and processing performance.

DESCRIPTION OF THE DRAWINGS

The positive electrode plate, the electrochemical device and the beneficial effects of the present application will be described in detail below with reference to the accompanying drawings and specific embodiments.

Figure 14:
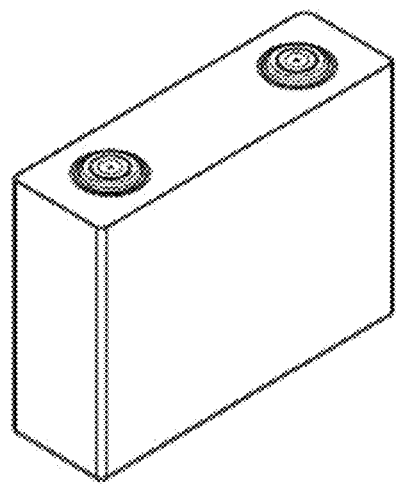
Figure 15:
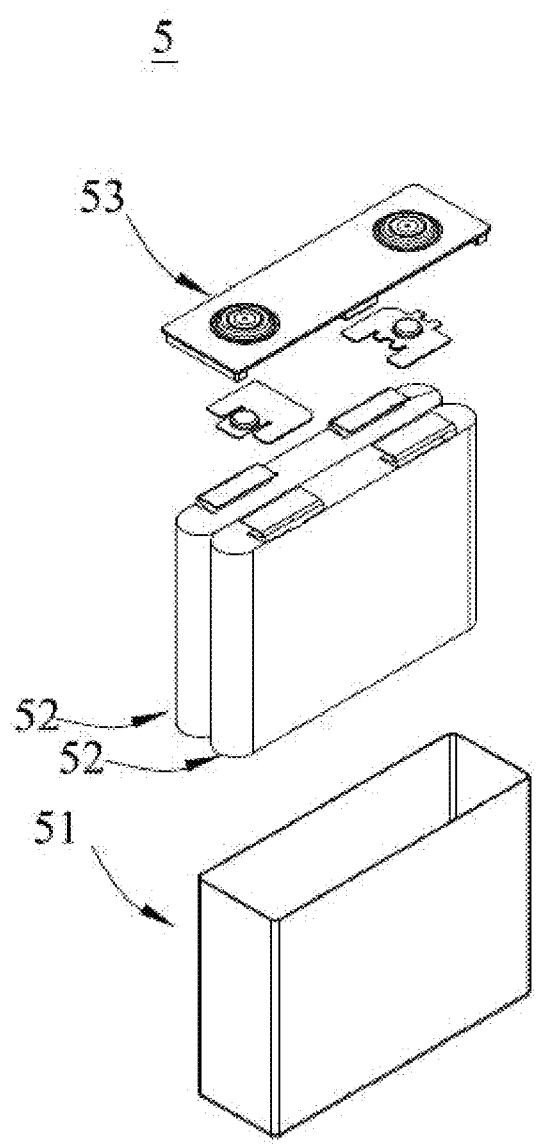
Figure 16:
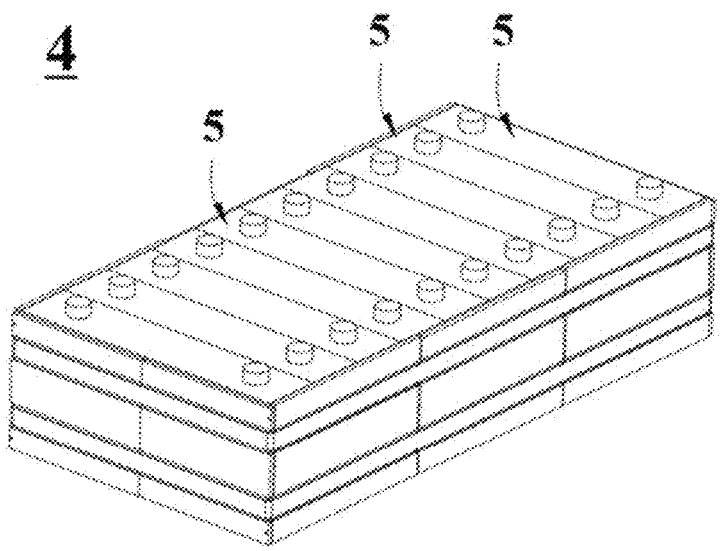
Figure 17:
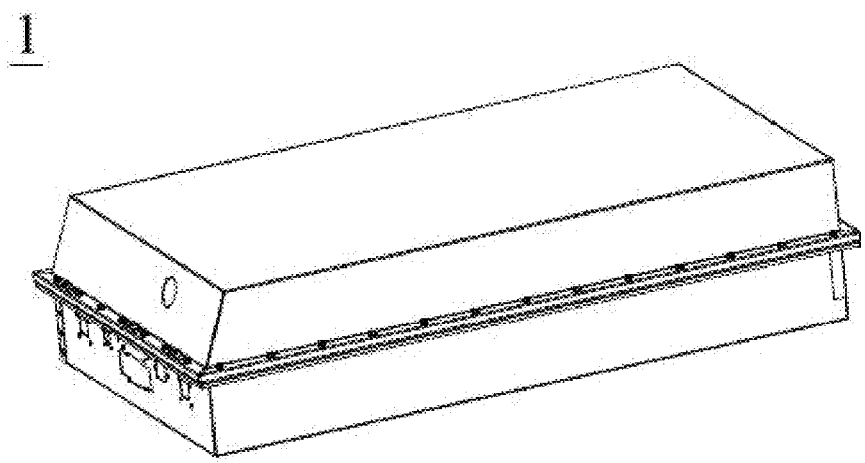
Figure 18:
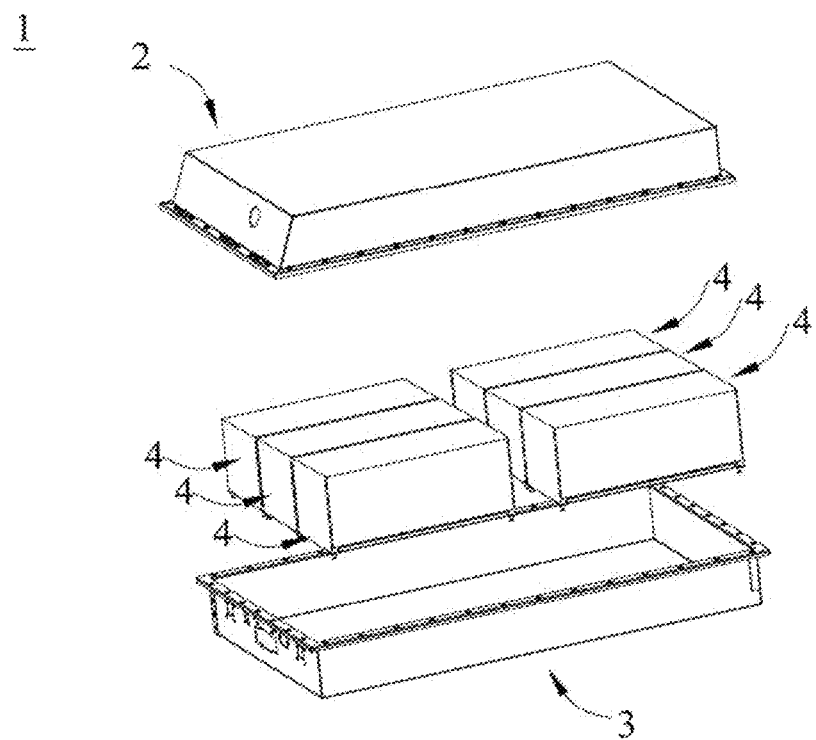

In above FIGS. 1-13, PP—Positive electrode plate; 10—Positive current collector; 101—Positive support layer; 102—Positive conductive layer; 103—Positive protective layer; 11—Conductive primer layer; 12—Positive active material layer; and NP—Negative electrode plate; 20—Negative current collector; 201—Negative support layer; 202—Negative conductive layer; 203—Negative protective layer; 21—Conductive primer layer; 22—Negative active material layer;

FIG. 14 is a perspective view of a lithium ion battery according to an embodiment of the present application;

FIG. 15 is an exploded view of FIG. 14;

FIG. 16 is a perspective view of a battery module according to an embodiment of the present application;

FIG. 17 is a perspective view of a battery pack according to an embodiment of the present application;

FIG. 18 is an exploded view of FIG. 17; and

Figure 19:
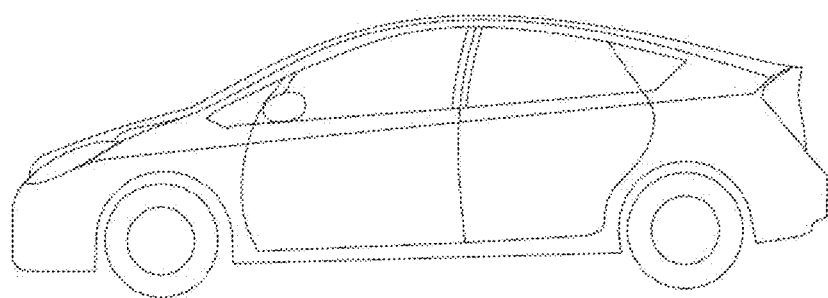

FIG. 19 is a schematic view showing an apparatus with a lithium ion battery as a power source according to an embodiment of the present application.

In above FIGS. 14-19, the denotation of the reference numerals is as follows: 1—battery pack; 2—upper casing; 3—lower casing; 4—battery module; 5—battery; 51—case; 52—electrode assembly and 53—top cover assembly.

DETAILED DESCRIPTION

The present application will be further elaborated below in conjunction with specific embodiments. It should be understood that these specific embodiments are only used to illustrate the present application, without limiting the scope of the present application.

In a first aspect of the present application, an electrode plate is provided, comprising a current collector and an electrode active material layer disposed on at least one surface of the current collector wherein the current collector comprises a support layer and a conductive layer disposed on at least one surface of the support layer, the conductive layer has a single-sided thickness D2 that satisfies: 30 nm $\leq D2 \leq 3$ μm; a conductive primer layer containing a first conductive material is provided between the current collector and the electrode active material layer, and the first conductive material in the conductive primer layer comprises at least one of a one-dimensional conductive material and a two-dimensional conductive material.

Obviously, the electrode plate may be a positive electrode plate or a negative electrode plate. When the electrode plate is a positive electrode plate, the current collector and the electrode active material layer therein will accordingly be a positive electrode current collector and a positive active material layer, respectively. When the electrode plate is a negative electrode plate, the current collector and the electrode active material layer therein will accordingly be a negative electrode current collector and a negative active material layer, respectively.

The current collector used for the electrode plate of the first aspect of the present application is a composite current collector, which is a composite of at least two materials. Structurally, the current collector comprises a support layer and a conductive layer disposed on at least one surface of the support layer, and the conductive layer has a single-sided thickness D2 that satisfies: 30 nm $\leq \leq D2 \leq 3$ μm. Therefore, the conductive layer functions as conductive effect in the current collector. The thickness D2 of the conductive layer is much smaller than that of metal current collectors such as Al foil or Cu foil commonly used in the prior art in which the thickness of commonly used Al foil and Cu foil metal current collectors is usually 12 μm and 8 μm, respectively, and thus the electrochemical device (such as lithium batteries) having the electrode plate may have increased mass energy density and volume energy density. In addition, when the composite current collector is applied as a positive electrode current collector, it can also greatly improve the nail penetration safety performance of positive electrode plate.

However, since the composite current collector has a thinner conductive layer, compared with the traditional metal current collector (Al foil or Cu foil), the composite current collector has poorer conductivity, and the conductive layer is easy to be damaged during the electrode plate processing process, thereby affecting electrical performance of the electrochemical device. In addition, the support layer (polymer material or polymer composite material) of the composite current collector has a greater rebound degree than traditional metal current collectors during electrode plate rolling and other processes, so the binding force between the support layer and the conductive layer and the binding force between the composite current collector and the electrode active material layer preferably are required to be enhanced by improving the interface.

In the electrode plate according to the present application, a conductive primer layer is additionally provided between the current collector and the electrode active material layer. Specifically, the conductive primer layer is disposed between the conductive layer of the current collector and the electrode active material layer. Therefore the conductive primer layer can improve the interface of the composite current collector and the electrode active material layer and can improve the binding force between the composite current collector and the electrode active material layer, and ensure that the electrode active material layer is more firmly disposed on the surface of the composite current collector. Such a primer layer may favorably overcome the disadvantages that the composite current collector has poor conductivity and that the conductive layer in the composite current collector is easy to be damage. The conductive primer layer improves electron transmission efficiency and reduces the resistance of the electrode plate containing the composite current collector by effectively repairing and constructing the conductive network among the current collector, the conductive primer layer and the active material. Thus, the electrode plate according to the present application may effectively reduce the direct current internal resistance (DCR) of battery cell, can increase the power performance of battery cell and thus may ensure that the battery cell is not prone to large polarization and lithium precipitation during long-term cycling. That is to say, the long-term reliability of battery cell is effectively improved.

The structure, materials and performance of electrode plates (and current collectors therein) involved in the embodiments of the present application are described in detail below.

[Conductive Layer of Current Collector]

In the current collector according to embodiments of the present application, the conductive layer functions as conduction and current collection, and is used to provide electrons to an electrode active material layer, compared to the traditional metal current collector.

The conductive layer comprises at least one material selected from metal conductive materials and carbon-based conductive materials.

The metal conductive material is preferably at least one of aluminum, copper, nickel, titanium, silver, nickel-copper alloy, and aluminum-zirconium alloy;

the carbon-based conductive material is preferably at least one of graphite, acetylene black, graphene, and carbon nanotubes;

preferably, the material for the conductive layer is a metal conductive material, that is, the conductive layer is preferably a metal conductive layer. When the current collector is a positive current collector, aluminum is usually used as the material for the conductive layer; and when the current collector is the negative current collector, copper is usually used as the material for the conductive layer.

When the conductive layer has a poor conductivity or its thickness is too small, the internal resistance of batteries will be large, and the polarization will be large. When the thickness of the conductive layer is too large, it cannot improve the mass energy density and volume energy density of batteries.

In an embodiment of the present application, the conductive layer has a single-sided thickness D2, and D2 preferably satisfies: 30 nm ≤ D2 ≤ 3 μm, more preferably 300 nm ≤ D2 ≤ 2 μm, most preferably 500 nm ≤ D2 ≤ 1.5 μm. The above-mentioned thickness range can better ensure that the current collector has a light-weight performance and good electrical conductivity both.

In a preferred embodiment of the present application, the single-sided thickness D2 of the conductive layer may have a upper limit of 3 μm, 2.5 μM, 1.8 μm, 1.2 μm, 1 μm, 900 nm, and the single-sided thickness D2 of the conductive layer may be have a lower limit of 800 nm, 700 nm, 600 nm, 500 nm, 450 nm, 400 nm, 350 nm, 300 nm, 100 nm, 50 nm, 30 nm; and the single-sided thickness D2 range of the conductive layer can be composed of any value of the upper limit or the lower limit. Preferably, 300 nm ≤ D2 ≤ 2 μM; more preferably 500 nm ≤ D2 ≤ 1.5 μm.

Since the thickness of the conductive layer in the present application is smaller, cracks and other damage are likely to occur during the production of the electrode plate. In such a situation, a conductive primer layer is introduced into the electrode plate and may function to buffer and protect the conductive layer, and may form a "repair layer" on the surface of the conductive layer, so as to improve the binding force and contact resistance between the current collector and the active material layer.

Generally, there are cracks in the conductive layer of the electrode plate according to the present application. The cracks usually exist irregularly in the conductive layer, which may be elongated cracks, cross-shaped cracks, divergent cracks, and the like; and which may be cracks that penetrate the entire conductive layer, or may be cracks formed on the surface layer. Cracks in the conductive layer are usually caused by rolling of electrode plate, excessive amplitude of welding tab, and excessive tension of substrate winding during electrode plate processing.

The conductive layer may be formed on the support layer by at least one of mechanical rolling, bonding, vapor deposition, and electroless plating. The vapor deposition is preferably physical vapor deposition (PVD). The physical vapor deposition is preferably at least one of evaporation and sputtering. The evaporation is preferably at least one of vacuum evaporating, thermal evaporation deposition, and an electron beam evaporation method (EBEM). The sputtering is preferably magnetron sputtering.

The conductive layer is preferably formed on the support layer by at least one of vapor deposition or electroless plating, so as to make the bonding between the support layer and the conductive layer stronger.

[Support Layer of Current Collector]

In the current collector of embodiments of the present application, the supporting layer functions as supporting and protecting the conductive layer. Since the support layer generally comprises organic polymer materials, the density of the support layer is usually less than that of the conductive layer, which can significantly increase the mass energy density of batteries compared to the traditional metal current collectors. In addition, since the support layer can produce a good bearing and protection effect on the conductive layer disposed on its surface, the common electrode plate fracture phenomenon in the traditional current collectors is not easy to occur in the current collector of present application.

The support layer comprises at least one selected from insulating polymer materials, insulating polymer composite materials, conductive polymer materials, and conductive polymer composite materials.

The insulating polymer material is for example at least one selected from polyamide, polyterephthalate, polyimide, polyethylene, polypropylene, polystyrene, polyvinyl chloride, aramid, acrylonitrile-butadiene-styrene copolymer, polybutylene terephthalate, poly p-phenylene terephthalamide, polyoxymethylene, epoxy resin, phenolic resin, polytetrafluoroethylene, polyphenyl sulfide, polyvinylidene fluoride, silicone rubber, polycarbonate, cellulose and its derivatives, starch and its derivatives, protein and its derivatives, polyvinyl alcohol and its cross-linked products, polyethylene glycol and its cross-linked products.

The insulating polymer composite material is for example selected from composite materials formed by insulating polymer materials and inorganic materials. The inorganic material is preferably at least one of a ceramic material, a glass material, and a ceramic composite material.

The conductive polymer material is for example at least one selected from polysulfur nitride polymer materials or doped conjugated polymer materials, such as polypyrrole, polyacetylene, polyaniline, and polythiophene.

The conductive polymer composite material is for example selected from composite materials formed by insulating polymer materials and a second conductive material. The second conductive material is at least one selected from conductive carbon materials, metal materials, and composite conductive materials. The conductive carbon material is at least one selected from carbon black, carbon nanotube, graphite, acetylene black, and graphene. The metal material is at least one selected from nickel, iron, copper, aluminum, and alloys of the foregoing metals. The composite conductive material is at least one selected from nickel-coated graphite powder and nickel-coated carbon fiber.

According to the actual needs of application environment, cost and other factors, those skilled in the art can reasonably select and determine materials for the support layer. The material for the support layer in the present application is preferably an insulating polymer material or an insulating polymer composite material, especially the case when the current collector is a positive electrode current collector.

When the current collector is a positive electrode current collector, the safety performance of batteries can be significantly improved by using a special current collector with a conductive layer having a particular thickness and being supported by an insulating layer. Since the insulating layer is non-conductive, it has a relatively high resistance, which can increase short-circuit resistance of batteries when a short circuit occurs under abnormal conditions, and greatly reduce the short-circuit current. Therefore, the short-circuit heat generation can be greatly reduced, thereby improving the safety performance of batteries. In addition, the conductive layer is thinner, and thus the local conductive network may be cut off in abnormal situations such as nail penetration, thereby preventing a large area of the electrochemical device or even the entire electrochemical device from being short-circuited. In this way, the damage of the electrochemical device caused by nail penetration can be limited to the piercing site, and only a "point disconnection" is formed, without affecting normal operation of the electrochemical device within a certain period of time.

The support layer has a thickness D1, and D1 preferably satisfies: 1 μm $\leqslant$ D1 $\leqslant$ 30 μm; more preferably 1 μm $\leqslant$ D1 $\leqslant$ 15 μm.

If the support layer is too thin, it will have insufficient mechanical strength, and easily break during the electrode plate processing process; if the support layer is too thick, the volume energy density of batteries using the current collector will be reduced.

Among them, the thickness D1 of the support layer may have an upper limit of 30 μm, 25 μm, 20 μm, 15 μm, 12 μm, 10 μm, 8 μm, and have a lower limit of 1 μm, 1.5 μm, 2 μm, 3 μm, 4 μm, 5 μm, 6 μm, 7 μm; the range of the thickness D1 of the support layer can be composed of any value of the upper or lower limit. Preferably, 1 μm $\leqslant$ D1 $\leqslant$ 8 μm. μm; more preferably 2 μm $\leqslant$ D1 $\leqslant$ 10 μm; most preferably 3 μm $\leqslant$ D1 $\leqslant$ 8 μm.

At the same time, the above mentioned specific thickness of the present application can further ensure that the current collector has a larger resistance, and significantly reduce battery heating when an internal short circuit occurs. When the conductive layer is aluminum, the above mentioned specific thickness can also significantly reduce or prevent aluminum heat of the positive electrode current, thereby ensuring batteries having good safety performance.

In addition, when the conductive layer is a metal conductive layer, it is preferable that the support layer has a normal-temperature Young's modulus that satisfies: 20 GPa $\geqslant$ E $\geqslant$ 4 GPa.

The normal temperature Young's modulus of the support layer described in this application is measured by: cutting the support layer sample into 15 mm×200 mm, measuring the sample thickness h (μm) with a micrometer, and performing the tensile test under normal temperature and pressure with a high-speed rail tensile machine in which an initial position is set, the sample between the clamps is set with 50 mm long and stretching is carried out at a speed of 50 mm/min, followed by recording load L(N) at break and the equipment displacement y(mm). From above results, stress ε=L/(15*h)*1000, and strain η=y/50*100. The stress-strain curve is drawn; the initial linear part of this curve is taken to obtain the slope of the curve as the Young's modulus E.

Since metal is relatively rigid relative to polymer or polymer composite materials, and has small deformation during the rolling of electrode plate processing, the support layer preferably has a normal temperature Young's modulus that satisfies: 20 GPa $\geqslant$ E $\geqslant$ 4 Gpa, so as to ensure that the deformation difference between the support layer and the conductive layer shall not be excessively large and the conductive layer will not be torn. This range can make the support layer have a certain rigidity, and can further improve the rigidity matching between the support layer and the conductive layer, so as to ensure that the deformation difference between the support layer and the conductive layer shall not be excessively large during the processing of the current collector and electrode plate.

Since the support layer has a certain rigidity (E $\geqslant$ 4 GPa), the current collector is not easy to deform or stretch excessively during the processing of the current collector and the electrode plate, so that the support layer and the conductive layer can be firmly bonded, and are not easy to be detached, which may prevent the conductive layer from being "forced" to expand and from causing damage. However, the Young's modulus of the support layer shall not be excessively large, otherwise the rigidity is too strong, which will cause difficulty in winding and winding, and poor workability. The range of 20 GPa $\geqslant$ E may ensure that the support layer have a certain degree of flexibility, and the electrode plates can also have a certain ability to withstand deformation.

Therefore, the normal temperature Young's modulus of the support layer preferably satisfies: 20 GPa $\geqslant$ E $\geqslant$ 4 Gpa. The current collector formed by using such a support layer has a certain degree of toughness, so that the current collector and the electrode plate have a certain ability to withstand deformation and are not easy to break.

In addition, it is preferable that the support layer has a thermal shrinkage rate at 90° C. of not more than 1.5% so as to ensure the thermal stability of the current collector during the electrode plate processing. The thermal shrinkage rate of the support layer described in this application is measured by cutting the support layer into a fixed size of 72 mm*54 mm, putting it in an oven at 90° C. for 1 hour, and measuring the length L0 and L1 before and after the test respectively. Thermal shrinkage=(L0−L1)/L0*100%.

[Protective Layer of Current Collector]

In some preferred embodiments of the present application, the current collector is further provided with a protective layer, the protective layer being provided on one surface of the conductive layer of the current collector or on both surfaces of the conductive layers of the current collector, i.e. on the surface of the conductive layer away from the support layer and on the surface facing the support layer.

The protective layer may be a metal protective layer or a metal oxide protective layer. The protective layer can prevent the conductive layer of the current collector from being damaged by chemical corrosion or mechanical damage, and can also enhance mechanical strength of the current collector.

Preferably, the protective layer is provided on both surfaces of the conductive layer of the current collector. The lower protective layer of the conductive layer (i.e. the protective layer that is provided on the surface of the conductive layer facing the support layer) can not only prevent the conductive layer from being damaged, enhance mechanical strength of the current collector, but also enhance the binding force between the support layer and the conductive layer and prevent peeling (i.e. delamination of the support layer and the conductive layer).

The upper protective layer of the conductive layer (i.e. the protective layer that is provided on the surface of the conductive layer away from the support layer) bring about the technical effect that is mainly to prevent the conductive layer from being damaged and corroded during processing for example the effect of electrolyte immersion, rolling, and the like on the surface of the conductive layer. In the electrode plate of the present application, the conductive primer layer is used to repair cracks in the conductive layer which may occur during rolling, winding, and the like, enhance its conductivity and make up the shortcoming of the composite current collector as a current collector. Therefore, the upper protective layer of the conductive layer can cooperate with the conductive primer layer to further provide protection for the conductive layer, thereby jointly improving the conductive effect of the composite current collector as a current collector.

Due to good conductivity, the metal protective layer can not only further improve mechanical strength and corrosion resistance of the conductive layer, but also reduce polarization of the electrode plate. The metal protective layer comprises at least one material, for example, selected from nickel, chromium, nickel-based alloys, and copper-based alloys, preferably nickel or nickel-based alloys.

Among them, nickel-based alloy is an alloy formed by adding one or more other elements to pure nickel as matrix. Preferably, it is a nickel-chromium alloy, which is an alloy formed of metallic nickel and metallic chromium. Optionally, the molar ratio of nickel to chromium is from 1:99 to 99:1.

Copper-based alloy is an alloy formed by adding one or more other elements to pure copper as matrix. Preferably, it is a copper-nickel alloy. Optionally, in copper-nickel alloy, the molar ratio of nickel to copper is from 1:99 to 99:1.

When metal oxide is used for the protective layer, due to its low ductility, large specific surface area, and high hardness, it can also form effective support and protection for the conductive layer, and has a good technical effect for improving the binding force between the support layer and the conductive layer. The metal oxide protective layer comprises at least one material for example selected from aluminum oxide, cobalt oxide, chromium oxide, and nickel oxide.

In the case of a positive electrode current collector, it is preferred that metal oxides are used as a protective layer of the composite current collector according to the present application to achieve good support and protection technical effects while further improving safety performance of the positive electrode plate and batteries. In the case of a negative electrode current collector, it is preferred that metals are used as a protective layer of the composite current collector according to the present application to achieve good support and protection, while further improving conductivity of the electrode plate and dynamic performance of batteries to reduce battery polarization.

The protective layer has a thickness D3, and D3 preferably satisfies: $D3 \leq \frac{1}{10}D2$ and $1 \text{ nm} \leq D3 \leq 200 \text{ nm}$. If the protective layer is too thin, it is not enough to protect the conductive layer; and if the protective layer is too thick, it will reduce mass energy density and volume energy density of batteries. More preferably, $5 \text{ nm} \leq D3 \leq 500 \text{ nm}$, further preferably $10 \text{ nm} \leq D3 \leq 200 \text{ nm}$, most preferably $10 \text{ nm} \leq D3 \leq 50 \text{ nm}$.

The materials for the protective layers on the both surfaces of the conductive layer can be the same or different, and the thickness can be the same or different.

Preferably, the thickness of the lower protective layer is smaller than that of the upper protective layer to help improve the mass energy density of batteries.

Further optionally, the thickness D3" of the lower protective layer and the thickness D3' of the upper protective layer meets a ratio relationship of: $\frac{1}{2}D3' \leq D3'' \leq \frac{4}{5}D3'$.

When the current collector is a positive electrode current collector, aluminum is usually used as the material of the conductive layer, and a metal oxide material is preferably used as the material of the lower protective layer. Compared to the situation in which metal is selected as the material of the lower protective layer, metal oxide materials have greater resistance. Therefore, this type of lower protective layer can further increase resistance of the positive electrode current collector to a certain extent, thereby further improving short circuit resistance in the event that a short circuit occurs due to abnormality and improving safety performance of batteries. In addition, since metal oxide has a larger specific surface area, the binding force between the lower protective layer made of the metal oxide material and the support layer is enhanced; and the lower protective layer can increase surface roughness of the support layer, and function as enhancing the binding force between the conductive layer and the supporting layer, thereby improving the overall strength of the current collector.

When the current collector is a negative electrode current collector, copper is usually used as the material of the conductive layer, and a metal material is preferably used as the protective layer. More preferably, on the basis the situation in which at least one metal protective layer is included, at least one of the upper protective layers and the lower protective layer further comprises a metal oxide protective layer, in order to simultaneously improve the conductivity and interface binding force of the negative electrode composite current collector.

[Current Collector]

FIGS. 1 to 8 show schematic structural views of current collectors used in the electrode plates according to some embodiments of the present application.

The schematic views of the positive electrode current collector are shown in FIGS. 1 to 4.

Figure 1:
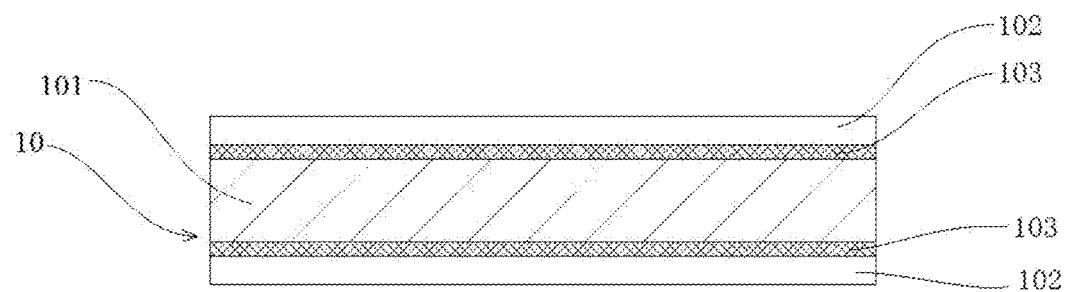
FIG. 1 is a schematic structural view of a positive current collector according to a particular embodiment of the present application.

In FIG. 1, the positive current collector 10 comprises a positive current collector support layer 101 and positive current collector conductive layers 102 disposed on two opposite surfaces of the positive current collector support layer 101, and also comprises a positive current collector protective layer 103 disposed on the surface (that is, the surface facing the positive current collector support layer 101) of each positive current collector conductive layers 102, i.e. a lower protective layer.

Figure 2:
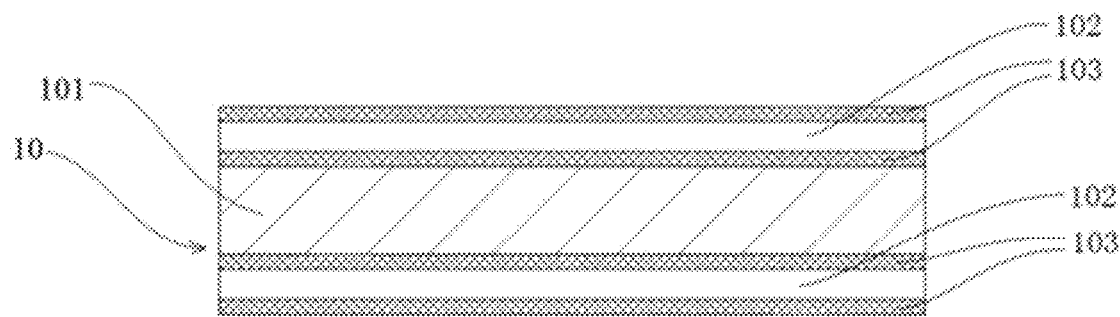
FIG. 2 is a schematic structural view of a positive current collector according to another particular embodiment of the present application.

In FIG. 2, the positive current collector 10 comprises a positive current collector support layer 101 and positive current collector conductive layers 102 disposed on two opposite surfaces of the positive current collector support layer 101, and also comprises positive current collector protective layers 103 disposed on two opposite surfaces of each positive current collector conductive layer 102, i.e. a lower protective layer and a upper protective layer.

Figure 3:
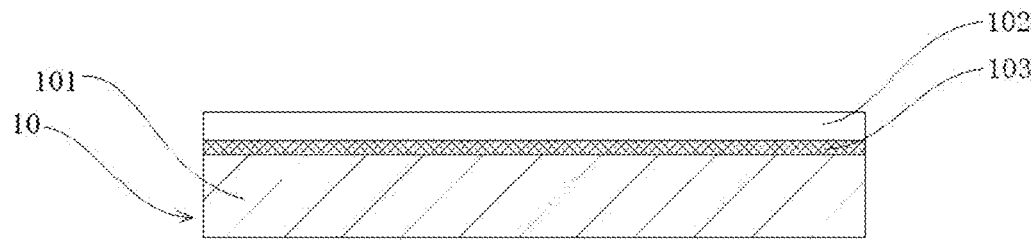
FIG. 3 is a schematic structural view of a positive current collector according to another particular embodiment of the present application.

In FIG. 3, the positive current collector 10 comprises a positive current collector support layer 101 and a positive current collector conductive layer 102 disposed on one surface of the positive current collector support layer 101, and also comprises a positive current collector protective layer 103 disposed on the surface facing the positive current collector support layer 101 of the positive current collector conductive layer 102, i.e. a lower protective layer.

Figure 4:
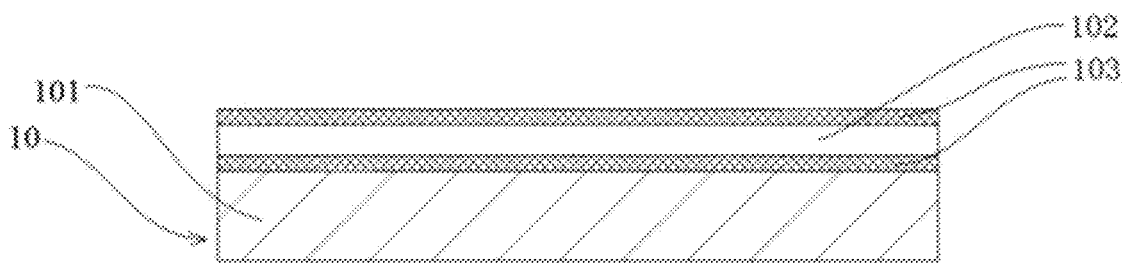
FIG. 4 is a schematic structural view of a positive current collector according to another particular embodiment of the present application.

In FIG. 4, the positive current collector 10 comprises a positive current collector support layer 101 and a positive current collector conductive layer 102 disposed on one surface of the positive current collector support layer 101, and also comprises positive current collector protective layers 103 disposed on two opposite surfaces of the positive current collector conductive layer 102, i.e. a lower protective layer and a upper protective layer.

The schematic views of the negative electrode current collector are shown in FIGS. 5 to 8.

Figure 5:
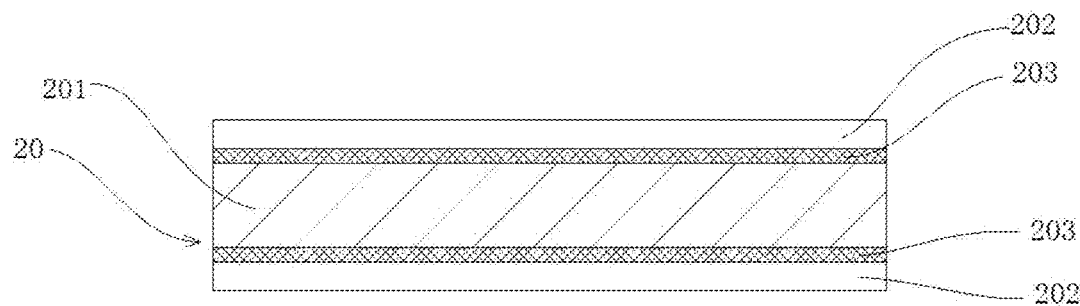
FIG. 5 is a schematic structural view of a negative current collector according to a particular embodiment of the present application.

In FIG. 5, the negative current collector 20 comprises a negative current collector support layer 201 and negative current collector conductive layers 202 disposed on two opposite surfaces of the negative current collector support layer 201, and also comprises a negative current collector protective layer 203 disposed on the surface facing the negative current collector support layer 201 of each negative current collector conductive layers 202, i.e. a lower protective layer.

Figure 6:
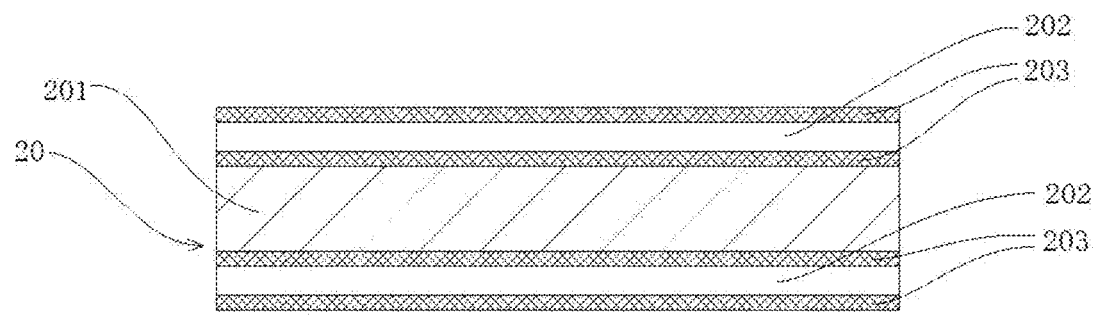
FIG. 6 is a schematic structural view of a negative current collector according to another particular embodiment of the present application.

In FIG. 6, the negative current collector 20 comprises a negative current collector support layer 201 and negative current collector conductive layers 202 disposed on two opposite surfaces of the negative current collector support layer 201, and also comprises negative current collector protective layers 203 disposed on two opposite surfaces of each negative current collector conductive layer 202, i.e. a lower protective layer and a upper protective layer.

Figure 7:
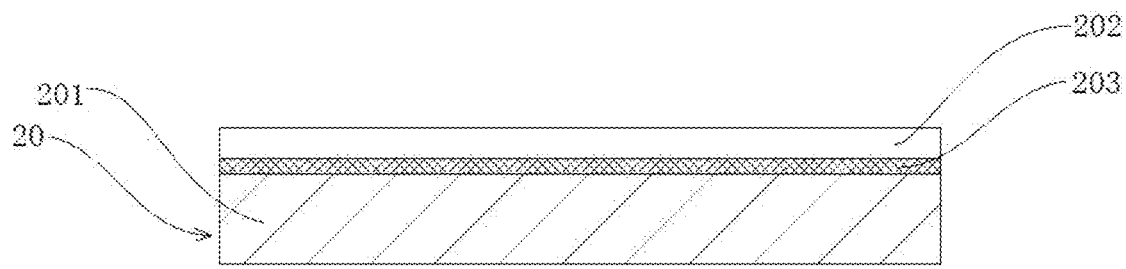
FIG. 7 is a schematic structural view of a negative current collector according to another particular embodiment of the present application.

In FIG. 7, the negative current collector 20 comprises a negative current collector support layer 201 and a negative current collector conductive layer 202 disposed on one surface of the negative current collector support layer 201, and also comprises a negative current collector protective layer 203 disposed on the surface facing the negative current collector support layer 201 of the negative current collector conductive layer 202, i.e. a lower protective layer.

Figure 8:
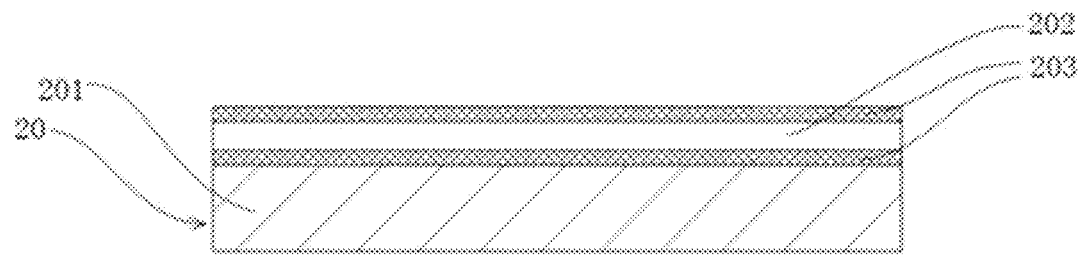
FIG. 8 is a schematic structural view of a negative current collector according to another particular embodiment of the present application.

In FIG. 8, the negative current collector 20 comprises a negative current collector support layer 201 and a negative current collector conductive layer 202 disposed on one surface of the negative current collector support layer 201, and also comprises negative current collector protective layers 203 disposed on two opposite surfaces of the negative current collector conductive layer 202, i.e. a lower protective layer and a upper protective layer.

Materials for the protective layers on two opposite surfaces of the conductive layer may be the same or different, and the thickness of the protective layers may be the same or different.

For the current collector used for the electrode plate according to the present application, as shown in FIGS. 1, 2, 5, and 6, the conductive layer may be provided on two opposite surfaces of the support layer, or, as shown in FIGS. 3, 4, 7, and 8, the conductive layer may be provided on only one side of the support layer.

In addition, although the composite current collector used for the electrode plate of the present application preferably comprises a current collector protective layer as shown in FIGS. 1 to 8, it should be understood that the current collector protective layer is not an essential structure of the current collector. In some embodiments, the current collector as used may not comprise a current collector protective layer.

[Conductive Primer Layer of Electrode Plate]

The conductive primer layer usually contains a binder in addition to the first conductive material.

Based on the total weight of the conductive primer layer, the weight percentage of the first conductive material is from 10% to 99%, preferably from 20% to 80%, more preferably from 50% to 80%; and the weight percentage of the binder is from 1% to 90%, preferably from 20% to 80%, and more preferably from 20% to 50%. This ratio is conducive to improving the conductivity of the electrode plate and the binding force between the current collector and the electrode active material layer.

The first conductive material may be at least one of a conductive carbon material and a metal material.

Among them, the conductive carbon material is at least one selected from a zero-dimensional conductive carbon, such as acetylene black, Ketjen black, conductive carbon black, an one-dimensional conductive carbon such as carbon nanotube, a two-dimensional conductive carbon such as flake conductive graphite, grapheme and a three-dimensional conductive carbon, such as reduced graphene oxide; and the metal material is at least one selected from metal powder, and metal nanotubes, such as aluminum powder, iron powder, and silver powder.

Preferably, in the present application, the first conductive material of the conductive primer layer comprises at least one of a one-dimensional conductive material and a two-dimensional conductive material. The one-dimensional conductive material is, for example, one-dimensional conductive carbon such as carbon nanotubes, and the two-dimensional conductive material is, for example, two-dimensional conductive carbon such as flake conductive graphite, graphene.

It is preferred that the first conductive material comprises a one-dimensional conductive material. Due to its special morphology, the one-dimensional conductive material may improve the conductivity of the conductive primer layer, especially when the addition amount of the first conductive material is constant, the one-dimensional conductive material can better improve the conductivity of the conductive primer layer, compared with other types of conductive materials. Carbon nanotube is preferred, which has an aspect ratio of 1,000 to 5,000.

It is preferred that the first conductive material comprises a two-dimensional conductive carbon material. Addition of the two-dimensional conductive carbon material produce the result that the two-dimensional conductive material in the conductive primer layer can produce "horizontal sliding" during compaction process of the electrode plate, thereby producing buffering effect, reducing destruction to the conductive layer of current collector during the compaction process and reducing cracks.

The two-dimensional conductive material is preferably flack conductive graphite or graphene, preferably flake conductive graphite with a D50 of 0.01 μm to 0.1 μm.

Part or all of the first conductive material may be at least one of a one-dimensional conductive material and a two-dimensional conductive material.

In addition to the one-dimensional conductive material and/or the two-dimensional conductive material, the first conductive material may also comprises at least one of other conductive carbon materials and metal materials.

In a preferred embodiment, the first conductive material is a combination of a one-dimensional conductive carbon material and a zero-dimensional conductive carbon material. One-dimensional carbon (such as carbon nanotubes) and zero-dimensional carbon (such as acetylene black carbon balls) can be combined in dots and lines to form a uniform conductive network, which can effectively enhance conductivity of the conductive primer layer. A single acetylene black carbon ball or carbon nanotubes is not as effective as their mixture.

Preferably, based on the total weight of the first conductive material, the first conductive material comprises 5 wt %-50 wt % of at least one of one-dimensional conductive material and two-dimensional conductive material, and 50 wt %-95 wt % of other conductive materials (for example zero-dimensional conductive carbon or metal materials, preferably zero-dimensional conductive carbon).

The binder may be for example at least one selected from styrene butadiene rubber, oil-dispersible polyvinylidene fluoride (PVDF), polyvinylidene fluoride copolymer (such as PVDF-HFP copolymer, and PVDF-TFE copolymer), sodium carboxymethyl cellulose, polystyrene, polyacrylic acid, polytetrafluoroethylene, polyacrylonitrile, polyimide, water-dispersible PVDF, polyurethane, polyvinyl alcohol, polyacrylates, polyacrylic acid-polyacrylonitrile copolymer, and polyacrylate-polyacrylonitrile copolymers.

Preferably, the binder used comprises a water-dispersible binder, namely the binder used is a water-dispersible binder or a mixture of a water-dispersible binder and an oil-dispersible binder, so that the DCR growth rate of the electrochemical device is small. The water-dispersible binder is, for example, at least one selected from water-dispersible PVDF, polyacrylic acid, polyurethane, polyvinyl alcohol, polyacrylates, polyacrylic acid-polyacrylonitrile copolymer, and polyacrylates-polyacrylonitrile copolymer. In the present invention, a "water dispersible" polymer material refers to such a polymer in which its molecular chain can be completely extended and dispersed in water, and an "oil dispersible" polymer material refers to such a polymer in which its molecular chain may be completely extended and dispersed in an oil solvent. Those skilled in the art may understand that one kind of polymer material can be separately dispersed in water and oil by using a suitable surfactant. In other words, by using a suitable surfactant, one kind of polymer material can be made into a water dispersible polymer material and an oil dispersible polymer material, respectively. For example, those skilled in the art can modify PVDF into a water-dispersible PVDF or an oil-dispersible PVDF as needed. When a mixture of a water-dispersible binder and an oil-dispersible binder is used, the water-dispersible binder preferably constitutes 30% to 100% of the total weight of the binder used.

The conductive primer layer has a single-sided thickness H of preferably 0.1 to 5 μm. Preferably H/D2 is from 0.5:1 to 5:1. If the H/D2 ratio is too small, it cannot effectively improve cracks of the conductive layer and improve conductivity of the electrode plate; if the ratio is too large, it will not only reduce the mass energy density of batteries, but also increase DCR of batteries, which is not conducive to dynamic performance improvement of batteries.

[Electrode Active Material Layer of Electrode Plate]

The electrode active material layer used for the electrode plate of the present application may be chosen from various conventional electrode active material layer in the art, which constitution and preparation process are well known in the art. The electrode active material layer generally comprises an electrode active material, a binder and a conductive agent. According to demand, the electrode active material layer may further comprise optional other additives or auxiliary agents. For the electrode plate of the present application, it is preferable that the active material in the electrode active material layer has an average particle diameter D50 of 5-15 μm. If D50 is too small, the electrode plate after compaction will have low porosity, which is not conducive to infiltration of electrolyte, and its larger specific surface area is likely to produce more side reactions with electrolyte, reducing reliability of battery cores; if D50 is too large, the conductive primer layer and the composite current collector is easy to be greatly damaged during the electrode plate compaction process. D50 refers to the particle size at which cumulative volume percentage of an active material reaches 50%, that is, a median volume distribution particle size. D50 can be measured using, for example, a laser diffraction particle size distribution measuring instrument (for example, Malvern Mastersizer 3000).

Preferably, the electrode active material layer also comprises at least one of a one-dimensional conductive material or a two-dimensional conductive material. Specifically, when the conductive primer layer comprises a one-dimensional conductive material, the electrode active material layer and the conductive primer layer contain the one-dimensional conductive material at the same time, preferably carbon nanotubes; alternatively, when the conductive primer layer contains a two-dimensional conductive material, the electrode active material layer and the conductive undercoat layer contain the two-dimensional conductive material at the same time, and preferably flake conductive graphite.

In addition, for the electrode plate of the present application, when the content of the binder in the electrode active material layer is higher, the active material layer has a better binding force with the conductive primer layer, and thus the entire film layer (collectively referred to as the active material layer and the conductive primer layer) has a better binding force with the composite current collector, so that the active material layer (or film layer) can effectively wrap the metal burrs generated in the conductive layer under abnormal conditions such as nail penetration to improve the safety performance of battery during nail penetration. Therefore, with regard to further improving battery safety, it is preferable that the content of the binder in the electrode active material layer is not less than 1 wt %, preferably not less than 1.5 wt % based on the total weight of the electrode active material layer. If the binder content is maintained at a certain amount, the active material layer will have a better binding force with the conductive primer layer, so that under abnormal conditions such as nail penetration, the active material layer can effectively wrap the metal burrs generated in the conductive layer to improve the safety performance of battery during nail penetration.

In a preferred embodiment of the present application, the thickness of the electrode active material layer (referring to the thickness of a single side in the case of double-layer coating) H' is preferably from 10 to 70 μm, more preferably from 20 to 65 μm, even more preferably from 30 to 60 μm, even more preferably from 45 to 55 μm.

For the electrode plate of the present application, the commonly used various electrode active materials in the art i.e. a positive active material may be used. For example, for a lithium battery, the positive active material may be selected from lithium cobalt oxide, lithium nickel oxide, lithium manganese oxide, lithium nickel manganese cobalt oxide, lithium nickel cobalt manganese oxide, lithium nickel cobalt aluminum oxide, transition metal phosphate, lithium iron phosphate and the like. However, the present application is not limited to these materials, and other conventionally known materials that can be used as positive active materials of lithium ion batteries can also be used. These positive active materials may be used alone or in combination of two or more. Preferably, the positive active material can be one or more selected from $LiCoO_2$, $LiNiO_2$, $LiMnO_2$, $LiMn_2O_4$, $LiNi_{1/3}Co_{1/3}Mn_{1/3}O_2$(NCM333), $LiNi_{0.5}Co_{0.2}$ $Mn_{0.3}$ $O_2$(NCM523), $LiNi_{0.6}Co_{0.2}Mn_{0.2}O_2$(NCM622), $LiNi_{0.8}Co_{0.01}Mn_{0.1}O_2$ (NCM811), $LiNi_{0.85}Co_{0.15}Al_{0.05}O_2$, $LiFePO_4$ and $LiMnPO_4$.

For the negative electrode plate, the commonly used various electrode active materials in the art i.e. a negative active material may be used. For example, for a lithium battery, the negative active material can be selected from carbonaceous materials such as graphite (artificial graphite or natural graphite), conductive carbon black, carbon fiber, metal or semi-metal materials or its alloy such as Si, Sn, Ge, Bi, Sn, and In, lithium-containing nitride or lithium-containing oxide, lithium metal or lithium aluminum alloy, and the like. It is well known for those skilled in the art that a slurry composed of electrode active materials, conductive agents, and binders is coated on the electrode current collector (or on the primer layer pre-coated on the electrode current collector), and then dried and other post-processing to form a desired electrode active material layer.

[Electrode Plate]

FIGS. 9 to 12 show the structural schematic views of the electrode plates according to some embodiments of the present application.

Figure 9:
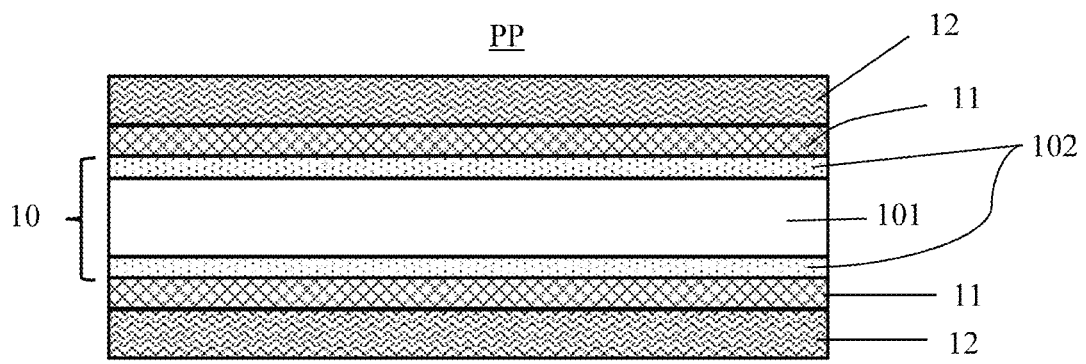
FIG. 9 is a schematic structural view of a positive electrode plate according to a particular embodiment of the present application.
Figure 10:
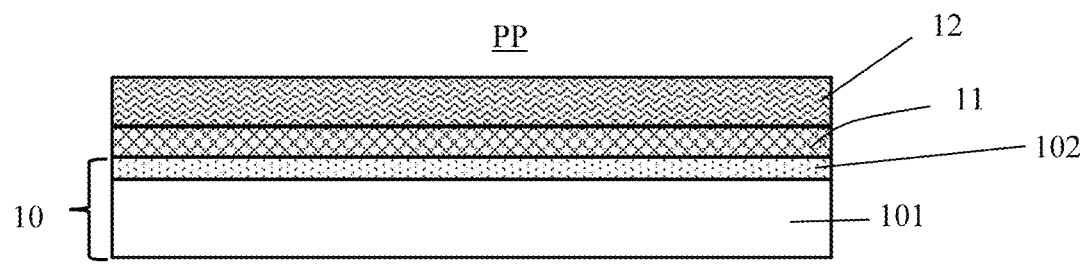
FIG. 10 is a schematic structural view of a positive electrode plate according to another particular embodiment of the present application.

The schematic views of the positive electrode plates are shown in FIGS. 9 and 10.

In FIG. 9, the positive electrode plate PP comprises a positive electrode current collector 10 and conductive primer layers 11 and positive active material layers 12 disposed on two opposite surfaces of the positive electrode current collector 10. The positive electrode current collector 10 comprises a positive electrode current collector support layer 101 and positive electrode current collector conductive layers 102 disposed on two opposite surfaces of the positive electrode collector support layer 101.

In FIG. 10, the positive electrode plate PP comprises a positive electrode current collector 10 and a conductive primer layer 11 and a positive active material layer 12 disposed on one surface of the positive electrode current collector 10. The positive electrode current collector 10 comprises a positive electrode current collector support layer 101 and a positive electrode current collector conductive layer 102 disposed on one surface of the positive electrode collector support layer 101.

Figure 11:
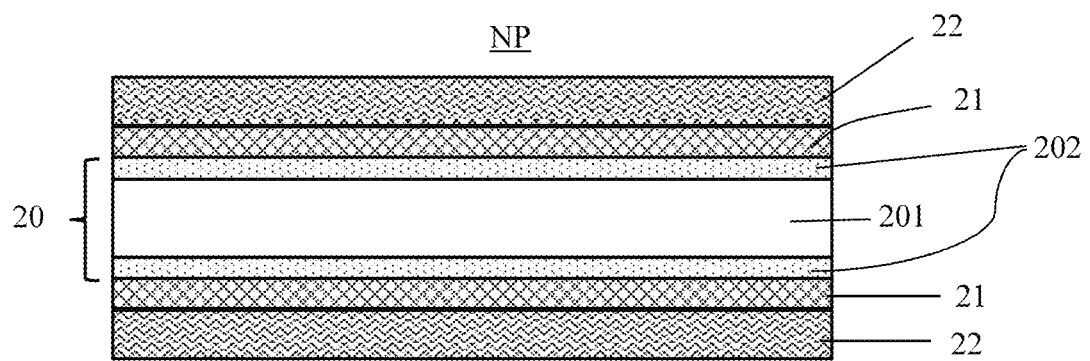
FIG. 11 is a schematic structural view of a negative electrode plate according to a particular embodiment of the present application.
Figure 12:
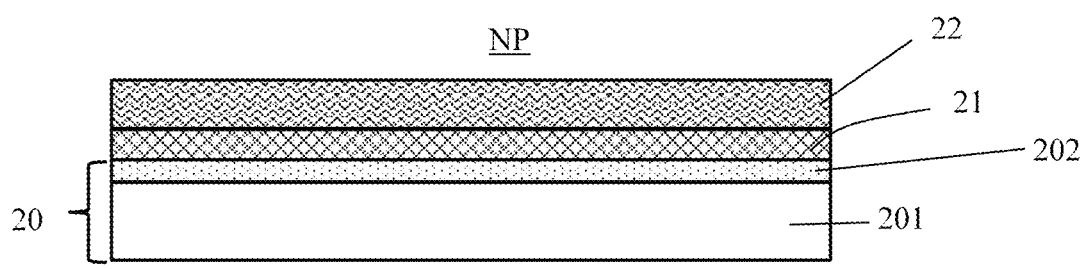
FIG. 12 is a schematic structural view of a negative electrode plate according to another particular embodiment of the present application.
Figure 13:
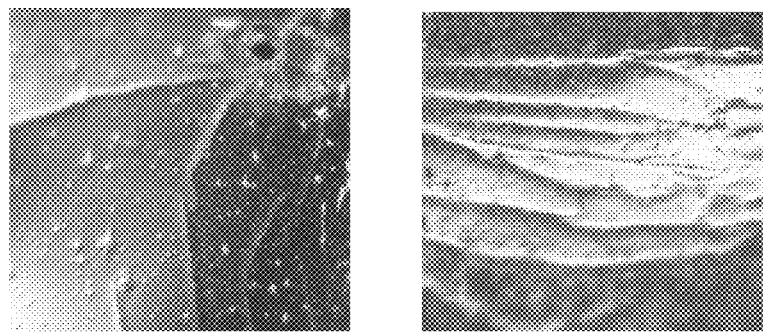
FIG. 13 is a microscopic surface diagram of the positive electrode current collector according to a particular embodiment of the present application.

The schematic views of the negative electrode plates are shown in FIGS. 11 and 12.

In FIG. 11, the negative electrode plate NP comprises a negative electrode current collector 20 and conductive primer layers 21 and negative active material layers 22 disposed on two opposite surfaces of the negative electrode current collector 20. The negative electrode current collector 20 comprises a negative electrode current collector support layer 201 and negative electrode current collector conductive layers 202 disposed on two opposite surfaces of the negative electrode collector support layer 201.

In FIG. 12, the negative electrode plate NP comprises a negative electrode current collector 20 and a conductive primer layer 21 and a negative active material layer 22 disposed on one surface of the negative electrode current collector 20. The negative electrode current collector 20 comprises a negative electrode current collector support layer 201 and a negative electrode current collector conductive layer 202 disposed on one surface of the negative electrode collector support layer 201.

As shown in FIGS. 9 to 12, the electrode active material layer may be provided on one surface of the current collector, or may be provided on both surfaces of the current collector.

Those skilled in the art can understand that when a current collector provided with a double-sided conductive layer is used, the electrode plate can be prepared by a both sides coating (that is, the electrode active material layer is provided on both surfaces of the current collector), or by a single side coating (that is, the electrode active material layer is only provided on one surface of the current collector). When a current collector with only a single-sided conductive layer is used, the electrode plate can only be prepared by a single side coating and the electrode active material layer (and conductive primer layer) can only be coated on the side of the current collector provided with the conductive layer.

[Electrochemical Device]

According to a second aspect of the present application, an electrochemical device is provided, comprising a positive electrode plate, a negative electrode plate, a separator and an electrolyte, wherein the positive electrode plate and/or the negative electrode plate is the electrode plate according to the first aspect of the present application.

The electrochemical device may be a capacitor, a primary battery, or a secondary battery. For example, it may be a lithium ion capacitor, a lithium ion primary battery, or a lithium ion secondary battery. In addition to using the positive electrode plate and/or negative electrode plate of the present application, the structure and preparation process of these electrochemical devices are well known per se. With the electrode plate of the present application, the electrochemical device can have improved safety performance (such as nail penetration safety performance) and electrical performance. In addition, the electrode plate of the present application is easy to process, so the manufacturing cost of the electrochemical device using the electrode plate of the present application can be reduced.

In the electrochemical device of the present application, there is no specific limitation to the specific types and compositions of the separator and electrolyte, which can be selected according to actual needs. Specifically, the separator can be selected from polyethylene film, polypropylene film, polyvinylidene fluoride film and their multilayer composite film. When the battery is a lithium ion battery, a non-aqueous electrolyte is generally used as the electrolyte. As the non-aqueous electrolyte, a lithium salt solution dissolved in an organic solvent is generally used. The lithium salt is, for example, an inorganic lithium salt such as $LiClO_4$, $LiPF_6$, $LiBF_4$, $LiAsF_6$, and $LiSbF_6$, or an organic lithium salt such as $LiCF_3SO_3$, $LiCF_3CO_2$, $Li_2C_2F_4(SO_3)_2$, $LiN(CF_3SO_2)_2$, $LiC(CF_3SO_2)_3$, and $LiC_nF_{2n+1}SO_3 (n \geq 2)$. The organic solvent used in the non-aqueous electrolyte is, for example, cyclic carbonates such as ethylene carbonate, propylene carbonate, butylene carbonate, and vinylene carbonate, chain carbonates such as dimethyl carbonate, diethyl carbonate, and methyl ethyl carbonate, chain esters such as methyl propionate, cyclic esters such as γ-butyrolactone, chain ethers such as dimethoxyethane, diethyl ether, diglyme, triglyme, cyclic ethers such as tetrahydrofuran and 2-methyltetrahydrofuran, nitriles such as acetonitrile and propionitrile, or a mixture of these solvents.

In a particular embodiment of the present application, the electrochemical device is a lithium ion battery. FIG. 14 is a perspective view of a lithium ion battery 5 according to an embodiment of the present application. FIG. 15 is an exploded view of FIG. 14. Referring to FIG. 14 and FIG. 15, the lithium ion battery 5 includes a case 51, an electrode assembly 52, a top cover assembly 53, and an electrolyte (not shown).

The electrode assembly 52 is packed in the case 51. There is no limitation to the number of electrode assembly 52, which may be one or more. The electrode assembly 52 comprises a positive electrode plate, a negative electrode plate, and a separator. The separator separates the positive electrode plate from the negative electrode plate. The electrolyte is injected into the case 51 and has soaked through the electrode assembly 52, the electrode assembly comprising, for example, a first electrode plate, a second electrode plate and a separator.

Please be noted that the lithium ion battery 5 shown in FIG. 14 is a can-type battery, but is not limited thereto, and the lithium ion battery 5 may be a pouch-type battery in which the case 51 is replaced by a metal plastic film and the top cover assembly 53 is removed.

Next, a battery module according to another aspect of the present application will be described.

FIG. 16 is a perspective view of a battery module 4 according to an embodiment of the present application.

The battery module 4 according to an embodiment of the present application comprises the lithium-ion battery 5 according to the present application.

Referring to FIG. 16, the battery module 4 includes a plurality of batteries 5. A plurality of lithium ion batteries 5 are arranged in the longitudinal direction. The battery module 4 can function as a power source or an energy storage device. The number of lithium ion battery 5 contained the battery module 4 can be adjusted according to the application and capacity of the battery module 4.

Next, a battery pack according to a still another aspect of the present application will be described.

FIG. 17 is a perspective view of a battery pack 1 according to an embodiment of the present application. FIG. 18 is an exploded view of FIG. 17.

The battery pack 1 according to the present application comprises the battery module 4 according to an embodiment of the present application.

Specifically, referring to FIG. 17 and FIG. 18, the battery pack 1 comprises an upper cabinet body 2, a lower cabinet body 3, and a battery module 4. The upper cabinet body 2 and the lower cabinet body 3 are assembled together to form a space in which the battery module 4 is packed. The battery module 4 is placed in the space formed by assembling the upper cabinet body 2 and the lower cabinet body 3 together. The battery module 4 comprises an output passing through one or both of the upper cabinet body 2 and the lower cabinet body 3 to supply power to the outside or to be charged from the outside. The number and arrangement of the battery modules 4 contained in the battery pack 1 can be determined according to actual needs.

Next, an apparatus according to still another aspect of the present application will be described.

FIG. 19 is a schematic view showing an apparatus with a lithium ion battery as a power source according to an embodiment of the present application.

The apparatus according to the present application comprises the lithium ion battery 5 according to an embodiment of the present application, and the lithium ion battery 5 can be used as a power source of the apparatus. In FIG. 19, the apparatus with the lithium ion battery 5 is an electric car. Of course, without limited thereto, the apparatus with the lithium ion battery 5 may be any other electric vehicles such as, an electric bus, an electric tram, an electric bicycle, an electric motorcycle, an electric scooter, an electric golf cart, an electric truck, electric ships, electric tools, electronic equipment and energy storage systems. The electric vehicle can be a pure electric vehicle, a hybrid electric vehicle, or a plug-in hybrid electric vehicle. Of course, according to the actual form of use, the apparatus according to the present application may comprises the battery module 4 as described in the present application. Of course, the apparatus according to the present application may also comprises the battery pack 1 as described in the present application.

Those skilled in the art can understand that the various limitations or preferred ranges for the component selection, component content, and material physical and chemical performance parameters of the conductive primer layer, electrode active material layer in the different embodiments of the present application mentioned above can be combined in any combination, which combination as obtained are still within the scope of the present application and are regarded as part of the disclosure of the present specification.

Unless otherwise specified, various parameters involved in the present specification have general meanings known in the art and can be measured according to methods known in the art. For example, the parameters can be tested according to the method given in examples of the present application. In addition, the preferred ranges and options of various different parameters given in various preferred embodiments can be combined arbitrarily, and various combinations obtained therefrom are deemed to be within the scope of the disclosure of the present application.

The following examples further illustrate the beneficial effects of the present application.

EXAMPLE

1. Preparation of Current Collectors without a Protective Layer:

A support layer of a certain thickness was selected, and a conductive layer of a certain thickness was formed on the surface of the support layer via vacuum evaporation, mechanical rolling or bonding.

In which, (1) The formation process via vacuum evaporation method was as follows: a surface cleaning treated support layer was placed in a vacuum coating chamber, and a high-purity metal wire in a metal evaporation chamber was melted and evaporated at a high temperature of 1600° C. to 2000° C., and the evaporated metal passed the cooling system in the vacuum coating chamber, and was finally deposited on the surface of the support layer to form a conductive layer.

(2) The formation process via mechanical rolling was as follows: a foil of conductive layer material was placed in a mechanical roller, which was rolled to a predetermine thickness by applying a pressure of 20 t to 40 t, and then the rolled foil was disposed on the cleaning treated surface of the support layer. Finally the both were placed in a mechanical roller, and were tightly combined by applying a pressure of 30 t to 50 t.

(3) The formation process via bonding was as follows: a foil of conductive layer material was placed in a mechanical roller, which was rolled to a predetermine thickness by applying a pressure of 20 t to 40 t, and then a solution of PVDF in NMP was coated on the cleaning treated surface of the support layer. Finally the conductive layer with the predetermined thickness was adhered to the surface of the support layer and dried at 100° C.

2. Preparation of Current Collectors with Protective Layers:

There were several ways to prepare current collectors with protective layers:

(1) A current collector with a protective layer (in which the protective layer was located between a support layer and a conductive layer) was prepared by firstly disposing the protective layer on the surface of the support layer by vapor deposition or coating, and then forming a conductive layer with a certain thickness on the surface of the support layer with the protective layer by vacuum evaporation, mechanical rolling or bonding. In addition, on the basis of the above, another protective layer was formed on the surface of the conductive layer away from the support layer by vapor deposition, in situ forming method or coating, to prepare a current collector with protective layers (in which the protective layers were located on two opposite surfaces of the conductive layer).

(2) A current collector with a protective layer (in which the protective layer was located between a support layer a the conductive layer) was prepared by firstly forming a protective layer on one surface of the conductive layer by vapor deposition, in situ forming method or coating, and then disposing the above mentioned conductive layer with a protective layer on the surface of support layer and disposing the protective layer between the support layer and the conductive layer. In addition, on the basis of the above, another protective layer was formed on the surface of the conductive layer away from the support layer by vapor deposition, in situ forming method or coating, to prepare a current collector with protective layers (in which the protective layers were located on two opposite surfaces of the conductive layer).

(3) A current collector with a protective layer (in which the protective layer was located on the surface of a conductive layer away from a support layer) was prepared by firstly forming a protective layer on one surface of the conductive layer by vapor deposition, in situ forming method or coating, and then disposing the above mentioned conductive layer with a protective layer on the surface of support layer by mechanical rolling or binding and disposing the protective layer on the surface of the conductive layer away from the support layer.

(4) A current collector with protective layer (in which protective layers were located on both opposite surfaces of a conductive layer) was prepared by firstly forming protective layers on both surface of the conductive layer by vapor deposition, in situ forming method or coating, and then disposing the above mentioned conductive layer with protective layers on the surface of support layer by mechanical rolling or binding.

(5) On the basis of the above "preparation of the current collector without a protective layer", another protective layer was formed on the surface of the conductive layer away from the support layer by vapor deposition, in-situ formation or coating to prepare a current collector with a protective layer (in which the protective layer was located on the surface of the conductive layer away from the support layer).

In the preparation example, the vapor deposition was carried out via vacuum evaporation, the in-situ formation method was carried out via in-situ passivation, and the coating method was carried out via gravure coating.

The formation steps via vacuum evaporation were as follows: a surface cleaning treated sample was placed in a vacuum plating chamber, and a protective layer material in an evaporation chamber was melted and evaporated at a high temperature of 1600° C. to 2000° C., and the evaporated protective layer material passed the cooling system in the vacuum plating chamber, and was finally deposited on the surface of the sample to form a protective layer.

The formation steps via in-situ passivation were as follows: a conductive layer was placed in a high-temperature oxidizing environment with an oxygen supply in which the temperature was controlled at 160° C. to 250° C. and was treated for 30 minutes, thereby forming a metal oxides protective layer.

The formation steps via gravure coating were as follows: a protective layer material was mixed with NMP while stirring, and then the above protective layer material slurry with a solid content of 20% to 75% was coated on the surface of sample, and then the gravure roller was used to control the coating thickness, which was finally dried at 100° C. to 130° C.

3. Preparation of Electrode Plate:

1) Positive Electrode Plates According to Examples:

A certain proportion of a first conductive agent (such as conductive carbon black) and a binder (such as PVDF or polyacrylic acid) were dissolved in a suitable solvent (such as NMP or water), and stirred to be homogenous to form a primer slurry.

The primer slurry was applied evenly to both sides of the composite current collector prepared according to the above method in which the coating speed was 20 m/min to form a primer layer, and then the primer layer was dried at an oven in a temperature of 70~100° C. for 5 min for drying.

After the primer layer was completely dried, 92 wt % of the positive active material, 5 wt % of the conductive agent Super-P ("SP") and 3 wt % of PVDF, were mixed in NMP as solvent to form a positive active material layer slurry. The positive active material layer slurry was coated on the surface of the primer layer via extrusion coating. Having been dried at 85° C., a positive active material layer was obtained.

Then, the current collector with the coatings was cold pressed and then cut, dried under vacuum at 85° C. for 4 hours. After welding, the positive electrode plate was obtained.

2) Comparative Positive Electrode Plate:

The comparative positive electrode plate was prepared in a similar preparation method to that of the positive electrode plate according to the above example with the exception that the positive active material layer slurry was directly coated on the surface of the composite current collector without providing a primer layer.

3) Conventional Positive Electrode Plate:

An Al foil with a thickness of 12 μm was used as a current collector. The conventional positive electrode plate was prepared in a similar preparation process to that of the preparation process of the comparative positive electrode plate above in which the positive active material layer slurry was directly coated on the surface of the Al foil current collector, and then worked up, thereby obtaining the conventional positive electrode plate.

4) Negative Electrode Plate According to Examples:

A certain proportion of a first conductive agent (such as conductive carbon black), and a binder (such as PVDF or polyacrylic acid) were dissolved in a suitable solvent (such as NMP or water), and stirred to be homogenous to form a primer slurry.

The primer slurry was applied evenly to both sides of the composite current collector prepared according to the above method in which the coating speed was 20 m/min to form a primer layer, and then the primer layer was dried at an oven in a temperature of 70~400° C. for 5 min for drying.

After the primer layer was completely dried, negative active material artificial graphite, conductive agent Super-P, thickener CMC, binder SBR were added to deionized water as a solvent at a mass ratio of 96.5:1.0:1.0:1.5 to form a negative active material layer slurry. The negative active material layer slurry was coated on the surface of the dried primer layer via extrusion coating. After drying at 85° C., a negative active material layer was obtained.

Then, the current collector with coatings was cold pressed and then cut, dried under vacuum at 110° C. for 4 hours. Having had a tab welded on, the negative electrode plate was obtained.

5) Comparative Negative Electrode Plate:

The comparative negative electrode plate was prepared in a similar preparation method to that of the preparation method of the negative electrode plate according to the above example with the exception that the negative active material layer slurry was directly coated on the surface of the composite current collector without providing a primer layer.

6) Conventional Negative Electrode Plate:

A Cu foil with a thickness of 8 μm was used as a current collector. The conventional negative electrode plate was prepared in a similar preparation process to that of the comparative negative electrode plate above in which the negative active material layer slurry was directly coated on the surface of the Cu foil current collector, and then worked up, thereby obtaining the conventional negative electrode plate.

4. Preparation of Battery:

Through the conventional battery manufacturing process, the positive electrode plate with a compaction density of 3.4 g/cm$^3$, PP/PE/PP separator and the negative electrode plate with a compaction density of 1.6 g/cm$^3$ were wound together into a bare cell. Then the base cell was put into a battery case, in which an electrolyte formulated with EC:EMC in a volume ratio of 3:7 and 1 mol/L of LiPF$_6$ was injected, followed by sealing, chemical conversion and other processes, thereby finally obtaining a lithium ion secondary battery (hereinafter briefly referred to as "battery").

5. Test for Battery Performance

1) Cycle Life Test for Lithium Ion Batteries:

The lithium ion battery was subjected to charge and discharge process at 45° C. The battery was first subjected to charge to 4.2V with a current of 1 C, then to discharge to 2.8V with a current of 1 C, the discharge capacity after the first cycle was recorded. Then the battery was subject to the 1 C/1 C charge and discharge for 1000 cycles and the battery discharge capacity at the 1000th cycle was recorded. The capacity retention rate at the 1000th cycle was obtained by dividing the discharge capacity at the 1000th cycle by the discharge capacity at the first cycle.

2) DCR Growth Rate Test

The secondary battery was adjusted to 50% SOC with a current of 1 C at 25° C., and the voltage U1 was recorded. Then, the battery was discharged with a current of 4 C for 30 seconds, and the voltage U2 was recorded. DCR=(U1−U2)/4 C. Then the battery was subject to the 1 C/1 C charge and discharge for 500 cycles and the DCR at the $500^{th}$ cycle was recorded. The DCR growth rate at the $500^{th}$ cycle was obtained as the ratio of the difference between the DCR at the $500^{th}$ cycle and the DCR at the first cycle relative to the DCR at the first cycle.

3) Puncture Test:

The secondary battery (from 10 samples) was fully charged to the charging cut-off voltage with a current of 1 C, and then charged with a constant voltage until the current dropped to 0.05 C. After that, charging was terminated. A high temperature resistant steel needle of φ8 mm was used to puncture the battery at a speed of 25 mm/s in the direction perpendicular to the battery. The puncture position should be close to the geometric center of the surface to be punctured, the steel needle stayed in the battery, and then observe if the battery had an indication of burning or exploding.

6. Test Results and Discussion:

6.1 Effect of Composite Current Collectors on Mass Energy Density of Battery

The specific parameters of the current collectors and their electrode plates of each example were shown in Table 1 in which the current collectors of the various examples listed in Table 1 were not provided with a protective layer. In Table 1, for the positive electrode current collector, the weight percentage of the current collector refers to the percentage of the weight of the positive electrode current collector per unit area divided by the weight of the conventional positive electrode current collector per unit area. For the negative electrode current collector, the weight percentage of the current collector is the percentage of the weight of the negative electrode current collector per unit area divided by the weight of the conventional negative electrode current collector per unit area.

TABLE 1

| Electrode plate No. | Current collector No. | Support layer | | Conductive layer | | Current collector Thickness | Weight percentage of current collector |
|---|---|---|---|---|---|---|---|
| | | Material | D1 | Material | D2 | | |
| Positive plate 1 | Positive current collector 1 | PI | 6 μm | Al | 300 nm | 6.6 μm | 30.0% |
| Positive plate 2 | Positive current collector 2 | PET | 4 μm | Al | 500 nm | 5 μm | 24.3% |
| Positive plate 3 | Positive current collector 3 | PET | 2 μm | Al | 200 nm | 2.4 μm | 11.3% |
| Conventional positive plate | Conventional positive current collector | / | / | Al | / | 12 μm | 100% |
| Negative plate 1 | Negative current collector 1 | PET | 5 μm | Cu | 500 nm | 6 μm | 21.6% |
| Negative plate 2 | Negative current collector 2 | PI | 2 μm | Cu | 800 nm | 3.6 μm | 23.8% |
| Negative plate 3 | Negative current collector 3 | PET | 8 μm | Cu | 1 μm | 10 μm | 39.6% |
| Negative plate 4 | Negative current collector 4 | PET | 6 μm | Cu | 1.5 μm | 9 μm | 48.5% |
| Negative plate 5 | Negative current collector 5 | PET | 4 μm | Cu | 1.2 μm | 6.4 μm | 37.3% |

TABLE 1-continued

| Electrode plate No. | Current collector No. | Support layer Material | Support layer D1 | Conductive layer Material | Conductive layer D2 | Current collector Thickness | Weight percentage of current collector |
|---|---|---|---|---|---|---|---|
| Negative plate 6 | Negative current collector 6 | PET | 10 μm | Cu | 200 nm | 10.4 μm | 23.3% |
| Negative plate 7 | Negative current collector 7 | PI | 8 μm | Cu | 2 μm | 12 μm | 65.3% |
| Conventional negative plate | Conventional negative current collector | / | / | Cu | / | 8 μm | 100% |

From the results of Table 1, it was shown that the weight of the positive current collector and the negative current collector according to the present application were reduced in a different extent compared to the traditional current collector, so that the mass energy density of batteries was improved. However, when the current collector comprising a conductive layer with a thickness of greater than 1.5 μm was used, it had a smaller effect on battery weight reduction, especially for a negative current collector.

6.2 Effect of Protective Layer on the Electrochemical Performance of Composite Current Collector On the basis of the current collectors of the various examples listed in Table 1, a protective layer was further formed to study the effect of the protective layer on the electrochemical performance of composite current collector. In table 2, "positive current collector 2-1" refers to the current collector obtained by forming a protective layer on the basis of "positive current collector 2" in Table 1 and the symbols of other current collectors have similar meanings.

TABLE 2

| Electrode plate No. | Current collector No. | Upper protective layer Material | Upper protective layer D3' | Lower protective layer Material | Lower protective layer D3" |
|---|---|---|---|---|---|
| Positive plate 2-1 | Positive current collector 2-1 | Nickel oxide | 10 nm | Nickel oxide | 8 nm |
| Positive plate 2-2 | Positive current collector 2-2 | Nickel oxide | 50 nm | Nickel oxide | 30 nm |
| Negative plate 4-1 | Negative current collector 4-1 | / | / | Nickel | 200 nm |
| Negative plate 4-2 | Negative current collector 4-2 | Nickel | 5 nm | / | / |
| Negative plate 4-3 | Negative current collector 4-3 | Nickel-based alloy | 100 nm | / | / |
| Negative plate 4-4 | Negative current collector 4-4 | Nickel | 10 nm | Nickel | 10 nm |
| Negative plate 4-5 | Negative current collector 4-5 | Nickel | 50 nm | Nickel | 50 nm |
| Negative plate 4-6 | Negative current collector 4-6 | Nickel | 100 nm | Nickel | 50 nm |

Table 3 shows the cycle performance data measured after the listed electrode plate in Table 2 is assembled into a battery.

TABLE 3

| Battery No. | Electrode plate | | Capacity retention rate at the 1000th cycle@45° C. |
|---|---|---|---|
| Battery 1 | Conventional negative plate | Conventional positive plate | 86.5% |
| Battery 2 | Conventional negative plate | Positive plate 2-12 | 80.7% |
| Battery 3 | Conventional negative plate | Positive plate 2-12-1 | 85.2% |
| Battery 4 | Conventional negative plate | Positive plate 2-12-2 | 85.4% |
| Battery 5 | Negative plate 4 | Conventional positive plate | 86.3% |
| Battery 6 | Negative plate 4-1 | Conventional positive plate | 87.1% |
| Battery 7 | Negative plate 4-2 | Conventional positive plate | 86.5% |
| Battery 8 | Negative plate 4-3 | Conventional positive plate | 86.7% |
| Battery 9 | Negative plate 4-4 | Conventional positive plate | 87.6% |
| Battery 10 | Negative plate 4-5 | Conventional positive plate | 87.8% |
| Battery 11 | Negative plate 4-6 | Conventional positive plate | 88.0% |

As shown in Table 3, compared with the battery 1 using the conventional positive electrode plate and the conventional negative electrode plate, the battery using the current collector of the present application had a good cycle life, which was equivalent to the cycle performance of a conventional battery. Especially, the battery made of a current collector comprising a protective layer had a further improved battery capacity retention rate, compared to the battery made of a current collector without a protective layer, indicating that the battery was more reliable.

6.3 Effect of the Conductive Primer Layer on the Electrochemical Performance of Batteries Taking a positive electrode plate as an example, effects of the conductive primer layer and the composition of the conductive primer layer on the electrochemical performance of batteries were explained below. Table 4 shows the specific composition and related parameters of the electrode plates and current collectors used therein for the batteries of each example and comparative example. Table 5 shows the performance measurement results of each battery.

TABLE 4

| Electrode plate No. | Current Collector No. | Support layer Material | D1 | Conductive layer Material | D2 | Conductive primer layer | Electrode active material layer |
|---|---|---|---|---|---|---|---|
| Comp. Positive plate 20 | Positive collector 4 | PET | 10 μm | Al | 1 μm | / | NCM333, D50 9.8 μm, thickness of active material layer 55 μm |
| Positive plate 21 | Positive collector 4 | PET | 10 μm | Al | 1 μm | Conductive carbon black 10%, water-dispersible polyacrylic acid 90%, thickness 1.5 μm | As above |
| Positive plate 22 | Positive collector 4 | PET | 10 μm | Al | 1 μm | Conductive carbon black 20%, water-dispersible polyacrylic acid 80%, thickness 1.5 μm | As above |
| Positive plate 23 | Positive collector 4 | PET | 10 μm | Al | 1 μm | Conductive carbon black 50%, water-dispersible PVDF 50%, thickness 1.5 μm | As above |
| Positive plate 24 | Positive collector 4 | PET | 10 μm | Al | 1 μm | Conductive carbon black 65%, water-dispersible PVDF 35%, thickness 1.5 μm | As above |
| Positive plate 25 | Positive collector 4 | PET | 10 μm | Al | 1 μm | Conductive carbon black 80%, water-dispersible PVDF 20%, thickness 1.5 μm | As above |
| Positive plate 26 | Positive collector 4 | PET | 10 μm | Al | 1 μm | Conductive carbon black 99%, water-dispersible PVDF 1%, thickness 1.5 μm | As above |
| Positive plate 27 | Positive collector 4 | PET | 10 μm | Al | 1 μm | Conductive carbon black 65%, oil-dispersible PVDF 35%, thickness 1.5 μm | As above |
| Positive plate 28 | Positive collector 4 | PET | 10 μm | Al | 1 μm | Conductive carbon black 80%, oil-dispersible PVDF 20%, thickness 1.5 μm | As above |
| Positive plate 29 | Positive collector 4 | PET | 10 μm | Al | 1 μm | Conductive carbon black 32.5%, flake conductive graphite (D50 0.05 μm) 32.5%, water-dispersible PVDF 35%, thickness 1.5 μm | As above |
| Positive plate 30 | Positive collector 4 | PET | 10 μm | Al | 1 μm | Conductive carbon black 65%, water-dispersible PVDF 35%, thickness 500 nm | As above |
| Positive plate 31 | Positive collector 4 | PET | 10 μm | Al | 1 μm | Conductive carbon black 65%, water-dispersible PVDF 35%, thickness 2 μm | As above |
| Positive plate 32 | Positive collector 4 | PET | 10 μm | Al | 1 μm | Conductive carbon black 65%, water-dispersible PVDF 35%, thickness 5 μm | As above |

TABLE 5

| Battery No. | Electrode plate | | DCR growth rate |
|---|---|---|---|
| Battery 20 | Comp. Positive plate 20 | Conventional Negative plate | 35% |
| Battery 21 | Positive plate 21 | Conventional Negative plate | 30.9% |
| Battery 22 | Positive plate 22 | Conventional Negative plate | 29% |
| Battery 23 | Positive plate 23 | Conventional Negative plate | 20% |
| Battery 24 | Positive plate 24 | Conventional Negative plate | 15% |
| Battery 25 | Positive plate 25 | Conventional Negative plate | 14.5% |
| Battery 26 | Positive plate 26 | Conventional Negative plate | 14% |
| Battery 27 | Positive plate 27 | Conventional Negative plate | 18.5% |
| Battery 28 | Positive plate 28 | Conventional Negative plate | 18.2% |
| Battery 29 | Positive plate 29 | Conventional Negative plate | 12.9% |
| Battery 30 | Positive plate 30 | Conventional Negative plate | 15.5% |
| Battery 31 | Positive plate 31 | Conventional Negative plate | 14.6% |
| Battery 32 | Positive plate 32 | Conventional Negative plate | 14.1% |

It was shown from the above test data:

1. When a composite current collector with a thinner conductive layer was used (that is, the comparative positive electrode plate 20 that did not contain a conductive primer layer), the battery had a large DCR and a low cycle capacity retention rate since the composite current collector had poor conductivity than the traditional metal current collector, and the conductive layer in the composite current collector was easy to be damaged. After a conductive primer layer was introduced, the conductive primer layer effectively repaired and constructed a conductive network between the current collector, the conductive primer layer and the active materials, which improved electron transmission efficiency and reduced the resistance between the current collector and the electrode active material layers, thereby effectively reducing DCR.

2. With the increase of the conductive agent content in the conductive primer layer (positive electrode plate 21 to 26), the DCR of batteries had been greatly improved.

3. Under the same composition, the introduction of water-dispersible binders made the improvement of DCR more obvious than oil-dispersible binders (positive electrode plate 24 vs. positive electrode plate 27 and positive electrode plate 25 vs. positive electrode plate 28).

4. With the increase of the thickness of the conductive primer layer (positive electrode plate 30 to positive electrode plate 32), the DCR of batteries had also been improved significantly. However, if the thickness of the conductive primer layer was too large, it was not conducive to improving the energy density of batteries.

In addition, the influence of the different composition of the first conductive agent in the conductive primer layer on battery performances was separately investigated. The specific electrode plate composition and battery performance measurement results were shown in Table 4-1 and Table 5-1.

Since flake graphite could produce "horizontal sliding", it acted as a buffer and reduced the damage to the conductive layer of the current collector during the compaction process, thereby reducing cracks. Therefore, the introduction of flake graphite further reduced DCR of batteries (positive electrode plate 24 vs. positive electrode plate 29).

From the positive electrode plate 24 to the positive electrode plate 24-A, 24-B, 24-C, 24-D, the first conductive material was composed of zero-dimensional carbon (conductive carbon black) and one-dimensional carbon (carbon nanotubes) in which the proportion of one-dimensional carbon gradually increased from 0% to 5%, 10%, 50%, and 100%. It can be seen from the DCR data that the DCR growth rate showed tendency of gradual decrease and then increase, indicating that one-dimensional carbon (such as carbon nanotubes) and zero-dimensional carbon (such as conductive carbon black) are combined in dots and lines to form a uniform conductive network which effectively

TABLE 4-1

| Electrode plate No. | Current Collector No. | Support layer Material | D1 | Conductive layer Material | D2 | Conductive Primer layer | Electrode active material layer |
|---|---|---|---|---|---|---|---|
| Positive plate 24 | Positive collector 4 | PET | 10 μm | Al | 1 μm | Conductive carbon black 65%, water-dispersible PVDF 35%, thickness 1.5 μm | NCM333, D50 9.8 μm, thickness of active material layer 55 μm |
| Positive plate 24-A | Positive collector 4 | PET | 10 μm | Al | 1 μm | Conductive carbon black 61.7%, carbon nanotube 3.3%, water-dispersible PVDF 35%, thickness 1.5 μm | As above |
| Positive plate 24-B | Positive collector 4 | PET | 10 μm | Al | 1 μm | Conductive carbon black 58.7%, carbon nanotube 6.5%, water-dispersible PVDF 35%, thickness 1.5 μm | As above |
| Positive plate 24-C | Positive collector 4 | PET | 10 μm | Al | 1 μm | Conductive carbon black 32.5%, carbon nanotube 32.5%, water-dispersible PVDF 35%, thickness 1.5 μm | As above |
| Positive plate 24-D | Positive collector 4 | PET | 10 μm | Al | 1 μm | carbon nanotube 65%, water-dispersible PVDF 35%, thickness 1.5 μm | As above |
| Positive plate 29 | Positive collector 4 | PET | 10 μm | Al | 1 μm | Conductive carbon black 32.5%, flake conductive graphite (D50 0.05 μm) 32.5%, water-dispersible PVDF 35%, thickness 1.5 μm | As above |

TABLE 5-1

| Battery No. | Electrode plate | | DCR growth rate |
|---|---|---|---|
| Battery 24 | Positive plate 24 | Conventional Negative plate | 15% |
| Battery 24-A | Positive plate 24-A | Conventional Negative plate | 13.5% |
| Battery 24-B | Positive plate 24-B | Conventional Negative plate | 13.2% |
| Battery 24-C | Positive plate 24-C | Conventional Negative plate | 12% |
| Battery 24-D | Positive plate 24-D | Conventional Negative plate | 13% |
| Battery 29 | Positive plate 29 | Conventional Negative plate | 12.9% |

It was shown from Table 4-1 and Table 5-1, that incorporation of at least one of one-dimensional conductive material (carbon nanotube) and two-dimensional conductive material (flake conductive graphite) in the first conductive material was preferred.

enhanced conductivity; and a single conductive carbon black or carbon nanotube was not as effective as their mixture.

6.4 Effect of the Content of the Binder in the Electrode Active Material Layer on the Electrochemical Performance of Batteries When the content of the binder in the electrode active material layer is higher, the active material layer has a better binding force with the conductive primer layer, and thus the entire film layer (collectively referred to as the active material layer and the conductive primer layer) has a better binding force with the composite current collector, so that the active material layer (or film layer) can effectively wrap the metal burrs generated in the conductive layer under abnormal conditions such as nail penetration to improve the safety performance of battery during nail penetration.

Taking a positive electrode plate as an example, the effect of the content of the binder in the electrode active material layer on the electrochemical performance of batteries will be explained from the perspective of the nail penetration safety performance of batteries.

The positive electrode plates were prepared according to the method described in the previous examples and a plurality of positive electrode plates with different binder content in their positive active material layer were prepared by adjusting the composition of the positive active material layer slurry. The specific electrode plate composition was shown in the table below.

TABLE 6

| Electrode plate No. | Current Collector No. | Support layer Material | D1 | Conductive layer Material | D2 | Conductive primer layer | Electrode active material layer |
|---|---|---|---|---|---|---|---|
| Positive plate 33 | Positive collector 4 | PET | 10 μm | Al | 1 μm | Conductive carbon black 65%, water-dispersible PVDF 35%, thickness 1.5 μm | NCM811, D50 6.5 μm, thickness of active material layer 55 μm, content of binder PVDF 0.5 wt % |
| Positive plate 34 | Positive collector 4 | PET | 10 μm | Al | 1 μm | Conductive carbon black 65%, water-dispersible PVDF 35%, thickness 1.5 μm | NCM811, D50 6.5 μm, thickness of active material layer 55 μm, content of binder PVDF 1 wt % |
| Positive plate 35 | Positive collector 4 | PET | 10 μm | Al | 1 μm | Conductive carbon black 65%, water-dispersible PVDF 35%, thickness 1.5 μm | NCM811, D50 6.5 μm, thickness of active material layer 55 μm, content of binder PVDF 2 wt % |
| Positive plate 36 | Positive collector 4 | PET | 10 μm | Al | 1 μm | Conductive carbon black 65%, water-dispersible PVDF 35%, thickness 1.5 μm | NCM811, D50 6.5 μm, thickness of active material layer 55 μm, content of binder PVDF 3 wt% |

Table 7 showed the nail penetration test results when the above-mentioned different positive electrode plates were assembled into batteries. It was shown in the results that the higher the content of the binder in the positive active material layer, the better the nail penetration safety performance of the corresponding battery was. Preferably, the binder content in the positive active material layer was not less than 1 wt %, more preferably not less than 1.5 wt %.

TABLE 7

| Battery No. | Electrode plate | | Nail penetration |
|---|---|---|---|
| Battery 33 | Positive plate 33 | Conventional Negative plate | 1 pass, 9 fail |
| Battery 34 | Positive plate 34 | Conventional Negative plate | 6 pass, 4 fail |
| Battery 35 | Positive plate 35 | Conventional Negative plate | 10 pass |
| Battery 36 | Positive plate 36 | Conventional Negative plate | 10 pass |

6.5 Surface Morphology of the Composite Current Collector

In the preparation process of the positive electrode plate 24, a small sample was taken after cold pressing, and the surface of the positive pole piece 24 was wiped with a dust-free paper soaked in DMC solvent to expose the surface of the composite current collector. After that, the exposed surface was observed with a CCD microscope for its surface morphology, which surface morphology diagram was shown in FIG. 13. From FIG. 13, obvious cracks were seen. This kind of crack was unique to the surface of the conductive layer of the composite current collector, and there was no such a crack on the surface of the traditional metal current collector. In the event that the composite current collector had a thinner conductive layer, cracks was likely to occur under pressure during the cold pressing of the electrode plate processing. In such a situation, the presence of a conductive primer layer could effectively repair and construct the conductive network between the current collector and the active material, improve the electron transmission efficiency and reduce the resistance between the current collector and the electrode active material layer, which could effectively reduce the DC internal resistance of battery cell, improve the power performance of battery cell, and ensure that battery cell was not prone to large polarization and lithium precipitation during long-term cycling. That is to say, long-term reliability of battery was effectively improved, which was characterized in significantly reduced DCR growth rate, thereby improving battery performance. The above observation results gave a possible theoretical explanation for the action mechanism of the conductive primer layer, but it should be understood that this application is not limited to this specific theoretical explanation.

It will be understood by those skilled in the art that the above application examples of the electrode plate of the present application are only exemplified to be used for a lithium battery, but the electrode plate of the present application can also be applied to other types of batteries or electrochemical devices, and still may produce good technical effect of the present application.

It will be apparent to those skilled in the art that the present application may be modified and varied in accordance with the above disclosure and teachings. Accordingly, the present application is not limited to the specific embodiments disclosed and described above, and modifications and variations of the present application are intended to be included within the scope of the claims of the present application. In addition, although some specific terminology is used in this specification, these terms are for convenience of illustration only and are not intended to limit the present application in any way.

What is claimed is:

1. An electrode plate comprising a current collector (10, 20) and an electrode active material layer (12, 22) disposed on at least one surface of the current collector (10, 20), wherein the current collector (10, 20) comprises a support layer (101, 201) and a conductive layer (102, 202) disposed on at least one surface of the support layer (101, 201), the conductive layer (102, 202) has a single-sided thickness D2 that satisfies: 30 nm≤D2≤3 μm, the conductive layer (102, 202) is a metal conductive layer, and the metal conductive layer comprises a material that is selected from at least one of aluminum, copper, titanium, silver, and aluminum-zirconium alloy or from a combination of nickel or nickel copper alloy with at least one of aluminum, copper, titanium, silver, and aluminum-zirconium alloy;

wherein a conductive primer layer (11, 21) containing a first conductive material and a binder is provided between the current collector (10, 20) and the electrode active material layer (12, 22), and the first conductive material in the conductive primer layer (11, 21) comprises at least one of a one-dimensional conductive material and a two-dimensional conductive material;

wherein the first conductive material is present in a weight percentage of 10% to 99%, and the binder is present in a weight percentage of 1% to 90% based on the total weight of the conductive primer layer (11, 21);

wherein based on the total weight of the first conductive material, the first conductive material comprises 5 wt % to 50 wt % of at least one of the one-dimensional conductive material and the two-dimensional conductive material, and 50 wt % to 95 wt % of other conductive materials; and wherein the conductive layer (102, 202) is further provided with a protective layer (103, 203) on its surface, the protective layer (103, 203) is a metal protective layer or a metal oxide protective layer, in which the metal protective layer comprises a material that is selected from at least one of nickel, chromium, nickel alloy and chromium alloy, the protective layer (103, 203) being provided on one surface of the conductive layer (102, 202) of the current collector (10, 20) facing the support layer (101, 201) or on both surfaces of the conductive layers (102, 202) of the current collector (10, 20); and wherein the conductive primer layer (11, 21) has a single-side thickness H of 0.1 to 5 μm and H/D2 is 0.5:1 to 5:1.

2. The electrode plate according to claim 1, wherein the support layer (101, 201) comprises at least one material selected from insulating polymer materials, insulating polymer composite materials, conductive polymer materials, and conductive polymer composite materials.

3. The electrode plate according to claim 2, wherein the support layer (101, 201) has a normal temperature Young's modulus that satisfies: 20 GPa≥E≥4 GPa.

4. The electrode plate according to claim 1, wherein the support layer (101, 201) has a thickness D1 that satisfies: 1 μm≤D1≤30 μm.

5. The electrode plate according to claim 1, wherein there are cracks in the conductive layer (102, 202).

6. The electrode plate according to claim 1, wherein the conductive layer (102, 202) has a single-sided thickness D2 that satisfies: 300 nm≤D2≤2 μm.

7. The electrode plate according to claim 1, wherein the protective layer (103, 203) has a thickness that satisfies: D3≤1/10D2 and 1 nm≤D3≤200 nm.

8. The electrode plate according to claim 1, wherein the first conductive material is present in a weight percentage of 20% to 80%; and/or, the binder is present in a weight percentage of 20% to 80% based on the total weight of the conductive primer layer (11, 21).

9. The electrode plate according to claim 1, wherein the binder is at least one selected from styrene butadiene rubber, oil-dispersible polyvinylidene fluoride (PVDF), polyvinylidene fluoride copolymer, sodium carboxymethyl cellulose, polystyrene, polyacrylic acid, polytetrafluoroethylene, polyacrylonitrile, polyimide, water-dispersible PVDF, polyurethane, polyvinyl alcohol, polyacrylates, polyacrylic acid-polyacrylonitrile copolymer, and polyacrylate-polyacrylonitrile copolymers.

10. The electrode plate according to claim 1, wherein the one-dimensional conductive material is one-dimensional conductive carbon; the two-dimensional conductive material is two-dimensional conductive carbon.

11. The electrode plate according to claim 1, wherein the other conductive material is at least one of a conductive carbon material and a metal material in which the conductive carbon material is at least one selected from a zero-dimensional conductive carbon, an one-dimensional conductive carbon, a two-dimensional conductive carbon, and a three-dimensional conductive carbon; the metal material is at least one selected from aluminum powder, iron powder and silver powder.

12. The electrode plate according to claim 1, wherein the electrode active material layer (12, 22) comprises an electrode active material, an electrode binder and an electrode conductive agent.

13. An electrochemical device comprising a positive electrode plate, a negative electrode plate, a separator and electrolyte wherein the positive electrode plate and/or the negative electrode plate is the electrode plate according to claim 1.

14. An apparatus characterized by comprising the electrochemical device as claimed in claim 13, wherein the electrochemical device is used as a power source of the apparatus.

15. The electrode plate according to claim 1, wherein the support layer (101, 201) has a thickness D1 that satisfies: 1 μm≤D1≤15 μm.

16. The electrode plate according to claim 1, wherein the conductive layer (102, 202) has a single-sided thickness D2 that satisfies: 500 nm≤D2≤1.5 μm.

17. The electrode plate according to claim 1, wherein the protective layer (103, 203) has a thickness that satisfies: D3≤1/10D2 and 10 nm≤D3≤50 nm.

18. The electrode plate according to claim 1, wherein the first conductive material is present in a weight percentage of 50% to 80%; and/or, the binder is present in a weight percentage of 20% to 50% based on the total weight of the conductive primer layer (11, 21).

\* \* \* \* \*